United States Patent [19]

Terada et al.

[11] Patent Number: 5,341,507
[45] Date of Patent: Aug. 23, 1994

[54] DATA DRIVE TYPE INFORMATION PROCESSOR HAVING BOTH SIMPLE AND HIGH FUNCTION INSTRUCTION PROCESSING UNITS

[75] Inventors: Hiroaki Terada; Hiroaki Nishikawa, both of Osaka; Tetsuo Yamasaki; Yoshie Inaoka, Hyogo; Kenji Shima, Hyogo; Shinji Komori, Hyogo; Shin-ichi Yoshida, Nara; Shunji Hine, Osaka; Youichiro Nishikawa, Hyogo; Shuji Hara, Osaka, all of

[73] Assignees: Mitsubishi Denki Kabushiki Kaisha, Tokyo; Sharp Kabushiki Kaisha, Osaka; Matsushita Electric Industrial Co., Ltd., Osaka; Sanyo Electric Co., Ltd., Osaka, all of Japan

[21] Appl. No.: 729,727

[22] Filed: Jul. 15, 1991

[30] Foreign Application Priority Data

Jul. 17, 1990 [JP] Japan ................... 2-191817

[51] Int. Cl.⁵ .............................................. G06F 15/82
[52] U.S. Cl. ...................................... 395/800; 395/375;
364/232.22; 364/931.11; 364/DIG. 1
[58] Field of Search ................... 364/DIG. 1, DIG. 2;
395/600, 800, 650, 375, 225

[56] References Cited
U.S. PATENT DOCUMENTS

| | | | |
|---|---|---|---|
| 4,153,932 | 5/1979 | Dennis et al. | 395/800 |
| 4,852,020 | 7/1989 | Morita | 364/521 |
| 4,866,634 | 9/1989 | Reboh et al. | 364/513 |
| 4,965,715 | 10/1990 | Yoshida | 364/200 |
| 4,967,341 | 10/1990 | Yamamoto et al. | 395/600 |
| 4,972,314 | 11/1990 | Getzinger et al. | 395/425 |
| 4,972,315 | 11/1990 | Yamasaki et al. | 395/400 |
| 5,113,339 | 5/1992 | Komatsu et al. | 395/200 |
| 5,115,510 | 5/1992 | Okamoto et al. | 395/775 |
| 5,185,888 | 2/1993 | Tanaka et al. | 396/500 |

OTHER PUBLICATIONS

Korth & Silberschatz, *Database System Concepts*, McGraw-Hill Book Company (New York, 1986) pp. 45-105.

Hung & Briggs, *Computer Architecture and Parallel Processing*, McGraw-Hill Book Company (1984), pp. 732-768.

*Primary Examiner*—Thomas C. Lee
*Assistant Examiner*—Paul R. Lintz
*Attorney, Agent, or Firm*—Lowe, Price, LeBlanc & Becker

[57] ABSTRACT

In a data driven type information processing apparatus, an operation processing unit. The operation processing unit executes processing of a high function instruction on the basis of corresponding information stored in a specification data memory, and branches data packets, received from a pair data detecting unit, to a simple instruction processing unit. The apparatus further includes a junction unit for joining data packets outputted from the high function and the simple function instruction processing units to output them to an output unit.

5 Claims, 33 Drawing Sheets

FIG. 3

| NODE N | INPUT: ① STRUCTURAL DATA A, ② STRUCTURAL DATA B |
| --- | --- |
| | OUTPUT ①: STRUCTURAL DATA C |
| | PROCESSING PARAMETER: SECOND ITEM OF INPUT ① IS EQUAL TO FIRST ITEM OF INPUT ② <br> FIRST ITEM OF OUTPUT ① IS FIRST ITEM OF INPUT ① <br> SECOND ITEM OF OUTPUT ① IS SECOND ITEM OF INPUT ① <br> THIRD ITEM OF OUTPUT ① IS SECOND ITEM OF INPUT ② |

| STRUCTURAL DATA A | ITEM NUMBER 3 float, int, int |
| --- | --- |
| STRUCTURAL DATA B | ITEM NUMBER 2 int, string |
| STRUCTURAL DATA C | ITEM NUMBER 3 float, int, string |

FIG. 5A

| A | |
|---|---|
| a | 1 |
| b | 2 |

| B | | |
|---|---|---|
| c | 3 | α |
| d | 4 | β |

⇓ (product)

| a | 1 | c | 3 | α |
|---|---|---|---|---|
| a | 1 | d | 4 | β |
| b | 2 | c | 3 | α |
| b | 2 | d | 4 | β |

FIG. 5B

| a | 1 | c | 3 | α |
|---|---|---|---|---|
| a | 1 | d | 4 | β |
| b | 2 | c | 3 | α |
| b | 2 | d | 4 | β |

⇓ (restriction)

| a | 1 | c | 3 | α |
|---|---|---|---|---|
| a | 1 | d | 4 | β |

FIG. 5C

| | A | | | |
|---|---|---|---|---|
| a | 1 | c | 3 | α |
| a | 1 | d | 4 | β |

| B | |
|---|---|
| α | 100 |
| β | 100 |

⇓ ( union )

| a | 1 | c | 3 | α | 100 |
|---|---|---|---|---|---|
| a | 1 | d | 4 | β | 100 |

FIG. 5D

| a | 1 | c | 3 | α | 100 |
|---|---|---|---|---|---|
| a | 1 | d | 4 | β | 100 |

⇓ (projection)

| a | c | α | 100 |
|---|---|---|---|
| a | d | β | 100 |

FIG. 8
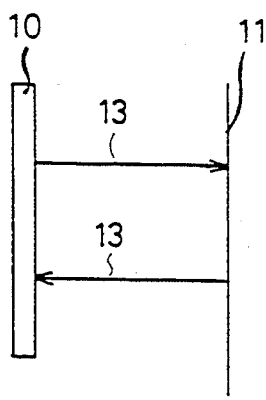
FIG. 9
| STOCK BOOK | | |
|---|---|---|
| ARTICLE NAME | QUANTITY | CONTAINER NUMBER |
| string | int | int |
| | | |
FIG. 10
| LACKING ARTICLE CONFIRMATION | | |
|---|---|---|
| STOCK LIST QUANTITY | Y | N |
| REGISTERING PROCESS | X | - |
FIG. 11
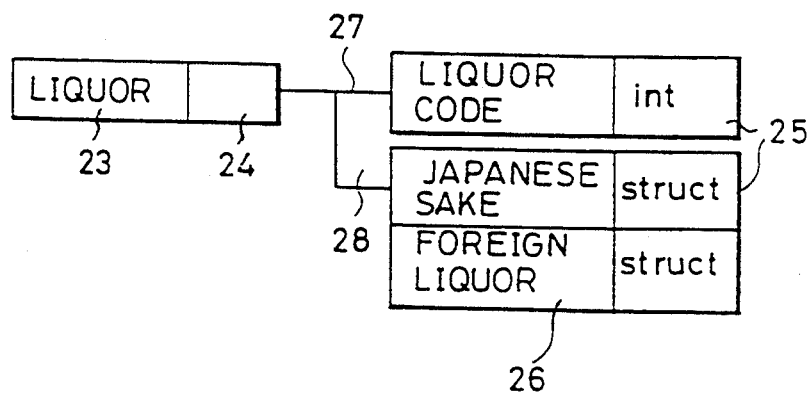

ADD MODULE M2, FURTHERMORE ADD ARCS C, D WITH PORT UNDEFINED

| NODE NUMBER | DATA |
|---|---|

| NODE NUMBER | INSTRUCTION CODE | DATA | FLAG |
|---|---|---|---|

| NODE NUMBER | INSTRUCTION CODE | DATA A | DATA B | FLAG |
|---|---|---|---|---|

| NODE NUMBER | INSTRUCTION CODE | DATA C | FLAG |
|---|---|---|---|

DATA DRIVE TYPE INFORMATION PROCESSOR HAVING BOTH SIMPLE AND HIGH FUNCTION INSTRUCTION PROCESSING UNITS

BACKGROUND OF THE INVENTION

1. Field of the Invention

The present invention relates to data driven type information processing apparatus, and particularly to data driven type information processing apparatus in which a plurality of instructions are simultaneously driven.

2. Description of the Background Art

In a conventional Neumann type computer various instructions are previously stored as a program in a program memory, and the instructions are sequentially read by sequentially specifying addresses of the program memory by a program counter to execute the instructions.

On the other hand, the data driven type information processing apparatus is a kind of non-Neumann type computer having no concept of sequentially executing instructions by a program counter. In such a data driven type information processing apparatus, architecture based on parallel processes of instructions is introduced. In the data driven type information processing apparatus, execution of instructions are enabled just when data objective to the operation is prepared and a plurality of instructions are simultaneously driven with the data, so that the programs are executed in parallel according to the natural flow of the data. As a result, it is considered that the time period required for the operation is considerably reduced.

FIG. 35 is a block diagram showing one example of structure of a convention data driven type information processing apparatus. FIG. 36 is a diagram illustrating one example of a data flow program stored in a program storing unit in the data driven type information processing apparatus of FIG. 35. FIGS. 37A-37D are diagrams showing examples of field structure of data packets processed in the data driven type information processing apparatus of FIG. 35. Referring to FIGS. 35-37D, a conventional data driven type information processing apparatus will be described below.

A data packet as shown in FIG. 37A is externally supplied to an input unit 101. The data packet at least includes a node number and data as shown in FIG. 37A. The data included in the data packet is data to be processed, and the node number is data indicating at which node the data is to be processed. The data packet inputted from input unit 101 is supplied to a program storing unit 102. Program storing unit 102 stores such a data flow program as shown in FIG. 36. Each set of the data flow program is formed of a node number, an instruction code and a flag. Program storing unit 102 reads the node number, the instruction code and the flag at a predetermined set of the data flow program on addressing on the basis of the node number of the inputted data packet, stores them in a new data packet together with data included in the data packet inputted from input unit 101, and outputs that data packet, as shown in FIG. 36. FIG. 37B shows a data packet outputted from program storing unit 102.

Pair data detecting unit 103 performs queuing, or a firing process of the data packet outputted from program storing unit 102. That is, when an instruction code shows 2-input instruction, it detects different two data packets having the same node number, stores the data A and B included in these data packets in a single data packet as shown in FIG. 37C and outputs the data packet. Pair data detecting unit 103 intactly outputs an inputted data packet when an instruction code of the inputted data packet indicates an 1-input instruction.

An operation processing unit 104 performs an operation process based on an instruction code for a data packet outputted from pair data detecting unit 103, stores data C indicating the operation results in a data packet as shown in FIG. 37D and outputs the same.

An output unit 105 controls whether the data packet should be externally provided as an output or should be returned to input unit 101 to be circulated in the data driven type information processing apparatus again based on whether a flag included in the data packet received from operation processing unit 104 is set or not.

FIG. 38 is a diagram showing one example of a data flow graph. In FIG. 38, a node N1 indicates an addition instruction, a node N2 indicates a multiplication instruction and a node N3 indicates a subtraction instruction. A node N4 indicates a decrement instruction and a node N5 indicates an increment instruction. Instructions of nodes N1, N2, N3 are 2-input instructions and instructions of nodes N4, N5 are 1-input instructions. The operation result of the node N1 is referred to by nodes N2 and N3.

In a conventional data driven type information processing apparatus as described above, operation processing unit 104 had structure for executing only basic operations such as arithmetic operation, logical operation and the like. This is because, when implementing such complicated operations as requiring a large number of parameters by operation processing unit 104, parameters necessary for executing such operations have to be carried on data packets and transported, which requires extremely long data packets length, resulting in extremely large structure of apparatus. The operations requiring a large number of parameters most typically include operation for manipulation of structural data (e.g., a group of data configuring a single meaning with plural pieces of data such as a data group configuring a table) (the relation operation, the sorting operation, etc.).

As an example, how to attain a joint manipulation of structural data as shown in FIG. 39 in the conventional data driven type information processing apparatus shown in FIG. 35 will be described. The manipulation shown in FIG. 39 is manipulation for, when the second item of the structural data A and the first item of the structural data B agree, coupling the two to produce structural data C. A value of the first item of structural data A is introduced into the first item of structural data C, a value of the second item of structural data A is introduced in the second item of structural data C, and the second item of structural data B is introduced into the third item of structural data C.

FIG. 40 is a diagram showing operation steps necessary when attaining the manipulation of the structural data as shown in FIG. 39 with the conventional data driven type processing apparatus shown in FIG. 35. That is, in order to attain the operation as shown in FIG. 39 in a conventional data driven type information processing apparatus, it is necessary to analyze contents of the manipulation shown in FIG. 39 in detail to divide it into a plurality of basic operations and execute individual basic operation one by one to attain the process as shown in FIG. 39 in the entirety.

As described above, in a conventional data driven type information processing apparatus, for performing processes requiring a large number of parameters such as manipulation of structural data, for example, extremely large number of execution steps of basic operations are necessary, which leads to a problem of an inefficient utilization of the apparatus. Also, when producing a program, such complicated processes have to be partitioned into basic operations one by one to be described, resulting in a problem that program production requires high level skill and great labor.

SUMMARY OF THE INVENTION

It is an object of the present invention to provide a data driven type information processing apparatus in which even high function (functionally high level) operating processes requiring a large number of parameters can be executed like normal basic operations, and the program description is simple.

A data driven type information processing apparatus according to the present invention includes input means, program storing means, pair data detecting means, operation processing means and output control means. The input means inputs a data packet at least including a node number and data. The program storing means stores a data flow program, reads out at least the node number and instruction information at the next level in the corresponding data flow program on the basis of the node number included in the data packet provided from the input means, and produces and outputs a new data packet including the node number, instruction information and the data in the data packet. The pair data detecting means receives the data packet outputted from the program storing means, detects two data packets to be paired having the same node number, and produces and outputs a new data packet having the data in both of the data packets. The operating processing means receives the data packet outputted from the pair data detecting means, performs operational process related to the data included in the data packet on the basis of the instruction information included in this data packet, and produces and outputs a data packet including data indicating the operation result. The output control means receives the data packet outputted from the operating process means, and controls whether the data packet is to be externally outputted or to be outputted to the input means. The operating processing means includes a branching means, a simple instruction process means, and a high function instruction process means. The branching means branches the data packet received from the program storing means into a data packet having a simple instruction and a data packet having a high function instruction. The simple instruction process means performs operation processes of the data packet having a simple instruction in the data packets branched by the branching means. The high function instruction process means stores process information necessary for executing a high function instruction in advance and performs operation processes of the data packet having a high function instruction of the data packets branched by the branching means on the basis of corresponding process information.

In the present invention, the high function instruction process means in the operation process means previously stores process information necessary for executing the high function instruction, and the high function instruction included in the data packet is executed on the basis of the process information. Accordingly, even when executing a high function instruction requiring great amount of process information (an instruction of relation operation, for example), the structure of a data packet inputted to the operation process means is similar to that of a data packet of a simple instruction, so that it is not required to put a large amount of process information on data packet to transport the same from the program storing means to the operation process means. Accordingly, the operation process means can perform extremely flexible and various processes as compared to a conventional case.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 3, is a diagram showing one example of process information for a high function instruction stored in a spec. data memory in FIG. 2.

FIGS. 5A-5D are diagrams illustrating typical relation operations which can be executed in a high function instruction processing unit.

FIG. 8 is a diagram illustrating a sequence chart which is one of specification description representation formats available in the program developing system shown in FIG. 6.

FIG. 9 is a diagram illustrating a relation table which is one of specification description representation formats used in the program developing apparatus shown in FIG. 6.

FIG. 10 is a diagram illustrating a determination table which is one of specification description representation formats available in the program developing system shown in FIG. 6.

FIG. 11 is a diagram illustrating a data block diagram which is one of specification description representation formats available in the program developing system shown in FIG. 6.

DESCRIPTION OF THE PREFERRED EMBODIMENTS

Figure 1:
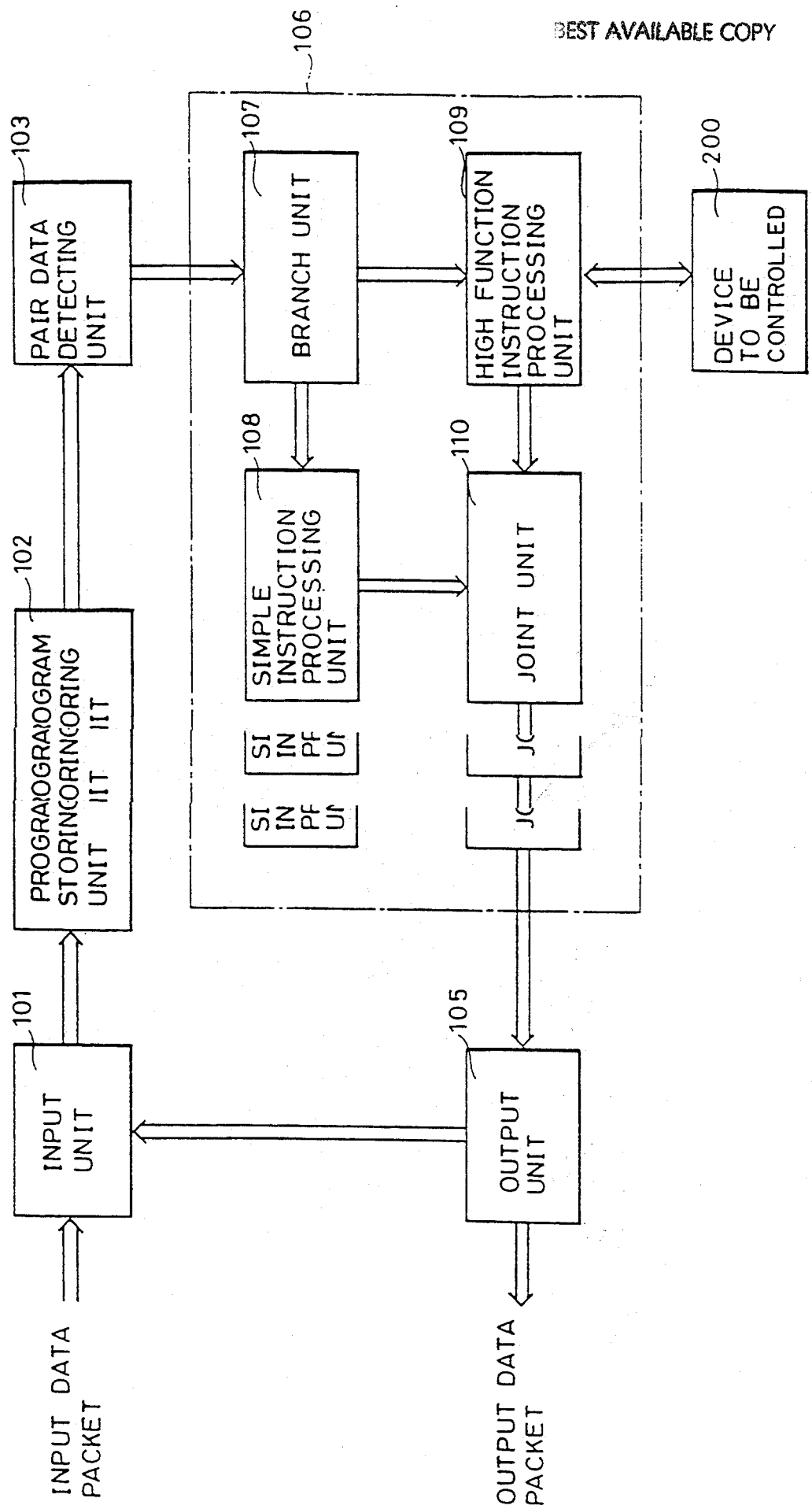
FIG. 1 is a schematic block diagram showing configuration of one embodiment of the present invention.
Figure 35:
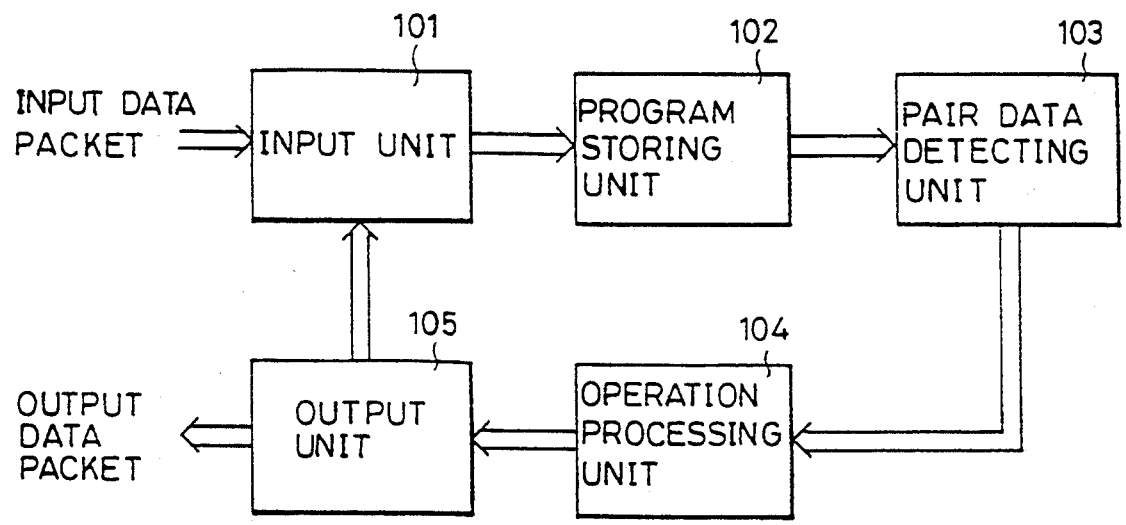
FIG. 35 is a schematic block diagram showing structure of a conventional data driven type information processing apparatus.

FIG. 1 is a schematic block diagram showing configuration of one embodiment of the present invention. In the figure, in the embodiment of FIG. 1, an operation process unit 106 is provided instead of operation process unit 104 in FIG. 35. Other configuration is the same as the configuration of the conventional data driven type information processing apparatus shown in FIG. 35.

Figure 36:
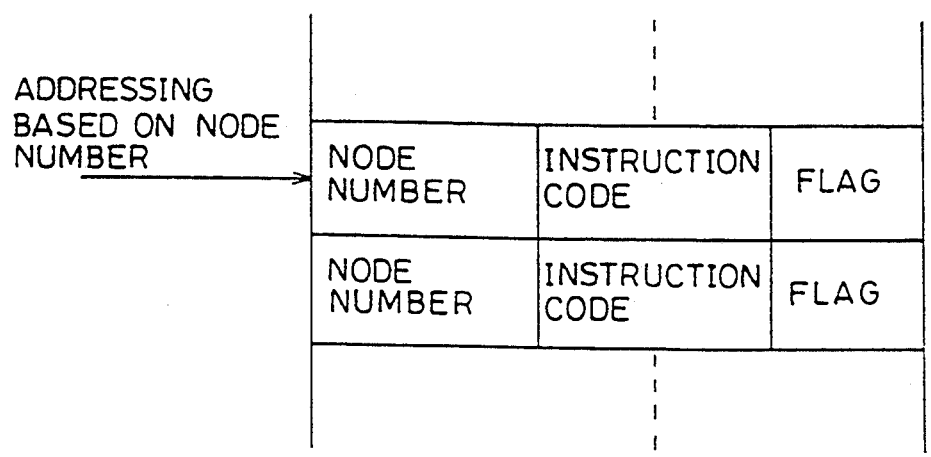
FIG. 36 is a diagram showing one example of a data flow program stored in the program storing unit shown in FIG. 35.
Figures 37A, 37B, 37C, 37D, 38:
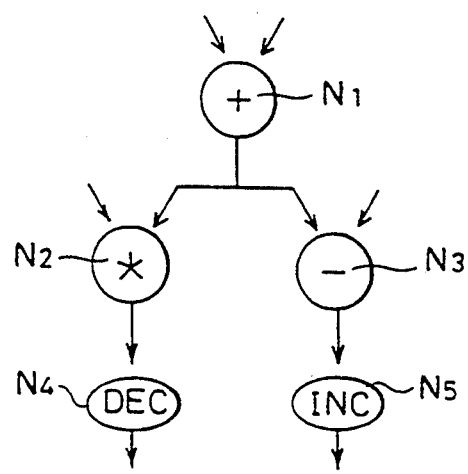
FIGS. 37A-37D are diagrams showing field structure of a data packet processed in the conventional data driven type information processing apparatus shown in FIG. 35.
FIG. 38 is a diagram showing one example of a data flow graph.

Operation processing unit 106 includes a branching unit 107, a simple instruction processing unit 108, a high function instruction processing unit 109 and a junction unit 110. The branching unit 107 branches an inputted data packet into simple instruction processing unit 108 and high function instruction processing unit 109 on the basis of an instruction code included in the data packet provided from a pair data detecting unit 103. That is, branching unit 107 outputs the data packet to simple instruction processing unit 108 if an instruction code included in the inputted data packet is a simple instruction (an instruction commanding basic operation such as arithmetic operation and logical operation). On the other hand, if an instruction mode included in the inputted data packet is a high function instruction (e.g., an instruction commanding operation of a high function requiring a large number of processing parameters such as relation operation), it outputs the data packet to high function instruction processing unit 109. Simple instruction processing unit 108 executes basic operations such as arithmetic operation and the logical operation, of which configuration may be the same as the configuration of the operation processing unit 104 in FIG. 36. Accordingly, simple instruction processing unit 108 attaches data indicating operation result of a simple instruction to a data packet to output it to junction unit 110. High function instruction processing unit 109 stores processing information necessary for executing a high function instruction, and a high function instruction is executed on the basis of the processing information. A device to be controlled 200 is connected to high function instruction processing unit 109. High function instruction processing unit 109 applies various processes produced in the process of executing a high function instruction to the device to be controlled 200. The device to be controlled 200 includes a data memory, a communication device, a display device, for example. High function instruction processing unit 109 attaches data indicating operation results of a high function instruction to a data packet and outputs it to junction unit 110. Junction unit 110 receives data packets outputted from simple instruction processing unit 108 and high function instruction processing unit 109 and outputs them to output unit 105.

Figure 2:
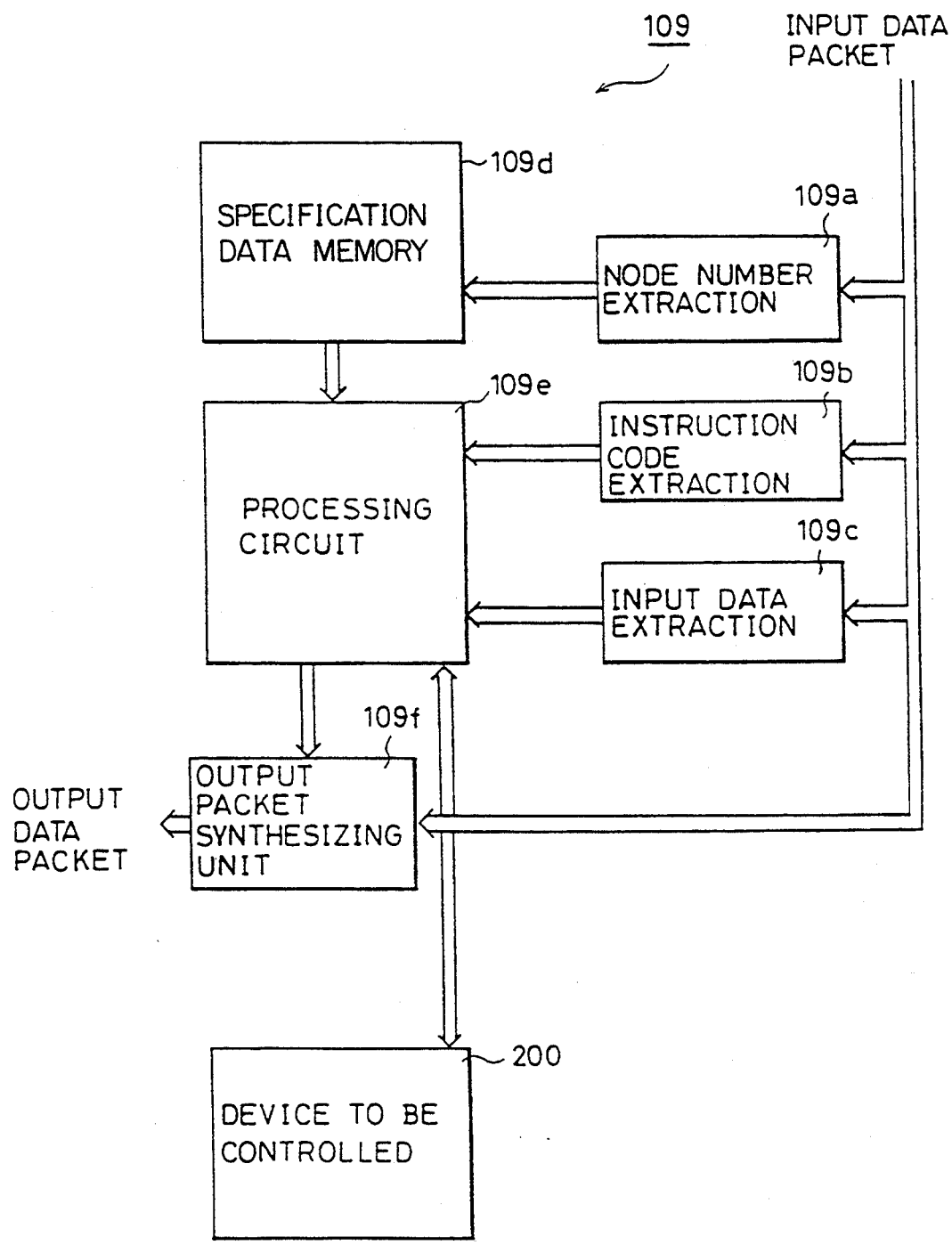
FIG. 2 is a block diagram showing further detail configuration of a high function instruction processing unit in FIG. 1.

FIG. 2 is a block diagram showing further detailed structure of high function instruction processing unit 109 shown in FIG. 1. In the figure, high function instruction processing unit 109 includes a node number extracting circuit 109a, an instruction code extracting circuit 109b, an input data extracting circuit 109c, a specification (referred to as spec. hereinafter) data memory 109d, a processing circuit 109e and an output packet synthesizing unit 109f. A data packet inputted from branching unit 107 is supplied to node number extracting circuit 109a, instruction code extracting circuit 109b and input data extracting circuit 109c, where a node number, an instruction code and data are extracted, respectively. The node number extracted by node number extracting circuit 109a is supplied to spec. data memory 109d. Spec. data memory 109d previously stores processing information necessary for the high function instruction (a parameter, or spec. data, or program information) as shown in FIG. 3, for example. Spec. data memory 109d, with the node number supplied from node number extracting circuit 109a as an address, reads out and outputs the processing information for the high function instruction corresponding to the node number. The processing information read out of spec. data memory 109d is supplied to processing circuit 109e. Also, the instruction code extracted by instruction code extracting circuit 109b and data extracted by input data extracting circuit 109c are supplied to processing circuit 109e. Processing circuit 109e executes a high function instruction corresponding to the supplied instruction code on the basis of the processing information supplied from spec. data memory 109d. In this execution process, processing circuit 109e controls device to be controlled 200. For example, if the device to be controlled 200 is a data memory, it controls re-writing the stored information therein. The processing circuit 109e outputs data indicating results of operation process of a high function instruction to packet synthesizing unit 109f. Output packet synthesizing unit 109f puts the data supplied from processing circuit 109e on a data packet and outputs it. An output of output packet synthesizing unit 109f is supplied to joint unit 110 in FIG. 1.

Figure 4:
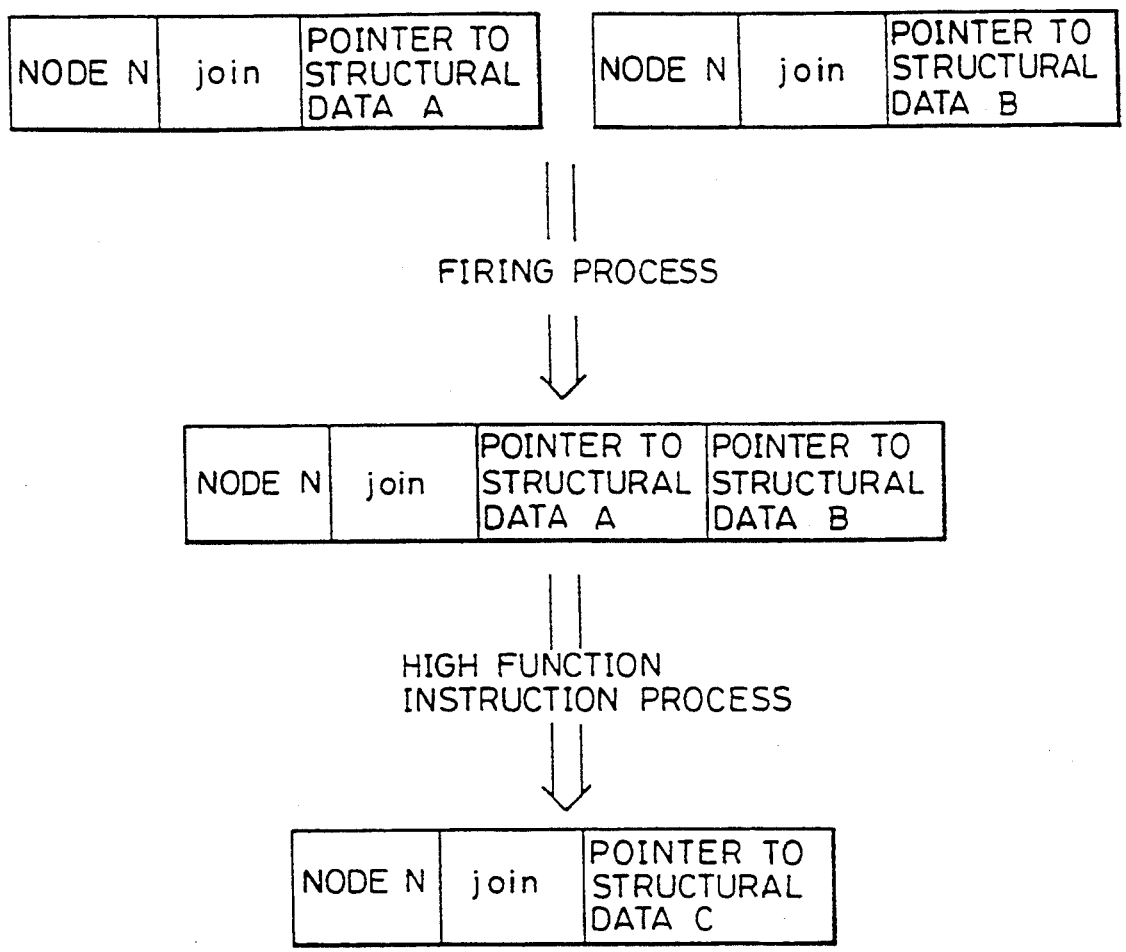
FIG. 4 is a diagram showing the process of processing a high function instruction is processed along the flow of a data packet in the embodiment shown in FIGS. 1 and 2.
Figure 39:
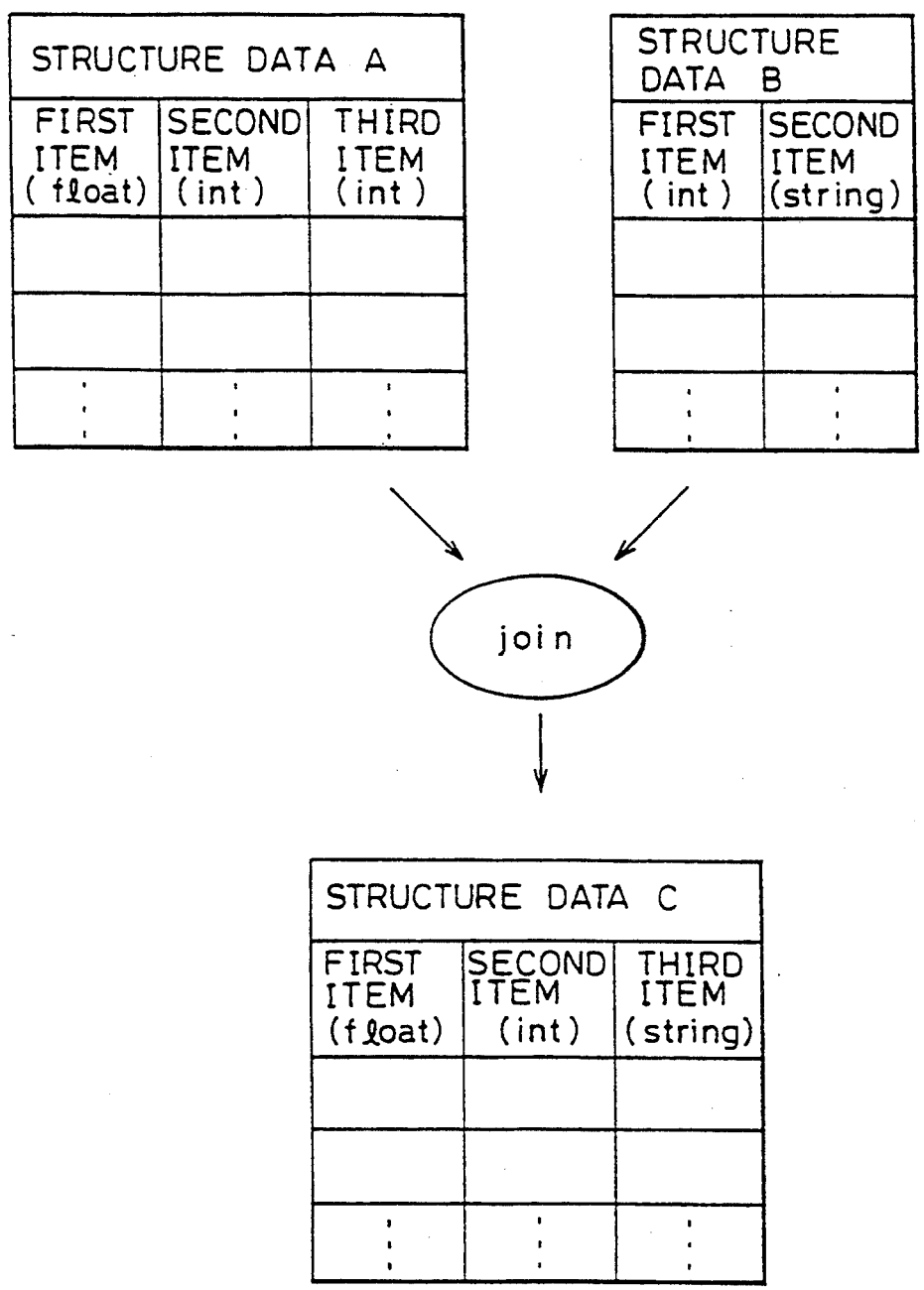
FIG. 39 is an explanatory diagram showing one example of connection manipulation of structural data.
Figure 40:
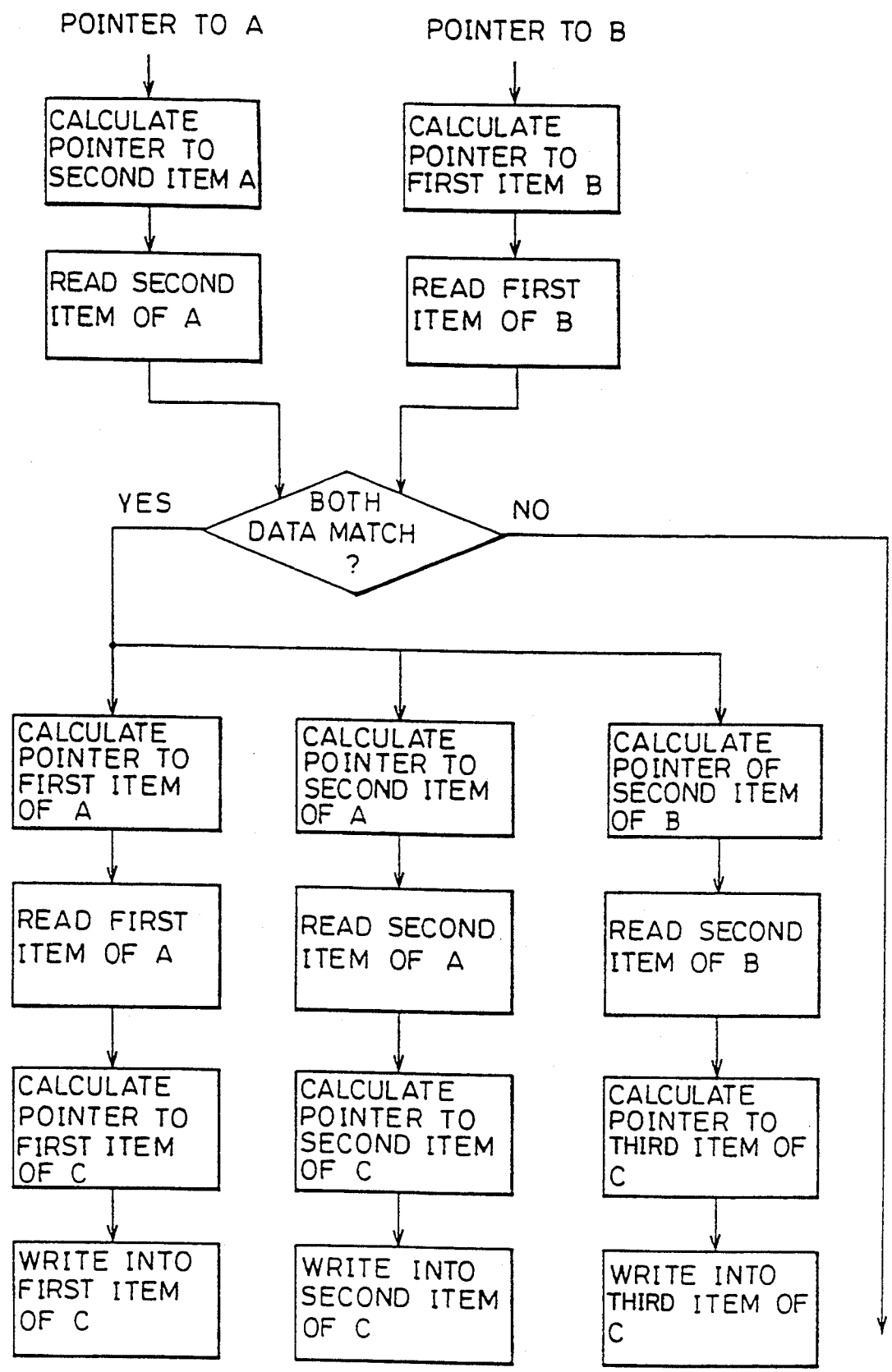
FIG. 40 is a flow diagram showing operation steps necessary when performing processes shown in FIG. 39 in the conventional data driven type information processing apparatus shown in FIG. 35.

Next, how join manipulation of structural data shown in FIG. 39 is processed will be described in the embodiment shown in FIGS. 1 and 2, for example. The join manipulation as shown in FIG. 39 is handled as one of relation operations without being partitioned into basic operations. That is, in a data flow program inside program storing unit 102, a join instruction is only described at a corresponding node for instructing join operation (join). Accordingly, the join instruction is included in the data packet outputted from program storing unit 102 as an instruction code as shown in FIG. 4. On the data packet, actual data of each structural data is not put, but information of a pointer of the structural data, that is address information is put.

Pair data detecting unit 103 queues for two sets of data packets having the same node number (e.g., N). As a result of the queuing, if two sets of data packets having the same node number N are detected, pair data detecting unit 103 performs a firing process as shown in FIG. 4, and puts pointer information of structural data A and pointer information of structural data B to a single packet and outputs it. When the instruction code included in the data packet supplied from pair data detecting unit 103 is a high function instruction such as a join instruction, branching unit 107 supplies the data packet to high function instruction processing unit 109. The node number, the instruction code and data are extracted from the supplied data packet in high function instruction processing unit 109. The extracted node number N is supplied to spec. data memory 109d and processing information corresponding to the node number N is read out of spec. data memory 109d. As shown in FIG. 3, various information necessary for processing high function instructions are stored for each node number in spec. data memory 109d. The processing information include formats of input data and output data, processing parameters and the like.

The data read from spec. data memory 109d is supplied to processing circuit 109e. Processing circuit 109e is formed of a digital signal processor, a microcomputer and the like, which performs execution processes of the high function instruction on the basis of the supplied processing information. That is, processing circuit 109e addresses structural data A and B in device to be controlled 200 (it is assumed to be a data memory, herein) on the basis of the pointer information of respective structural data A and B extracted by input data extracting circuit 109c and makes a determination as to whether the second item of the structural data A and the first item of the structural data B are equal to each other or not. When a determination is made that both data are equal, the structural data C is written in a certain area in data memory 200. Then, a value of the first item of the structural data A is written in the first item of structural data C, a value of second item of the structural data A is written in the second item of the structural data C, and the second item of the structural data B is written in the third item of the structural data C. In this way, the structural data C resulting from joining the structural data A and B is produced in the device to be controlled 200. On the other hand, processing circuit 109e supplies pointer information of the structural data C to output packet synthesizing unit 109f. Output packet synthesizing unit 109f produces a data packet including pointer information of the structural data C as shown in FIG. 4 and outputs it to join unit 110.

As described above, in the embodiment shown in FIGS. 1 and 2, even when executing a high function instruction requiring a large amount of processing information, a relation operation, for example, the structure of a data packet inputted to operation processing unit 106 is like that of a data packet of a simple instruction as shown in FIG. 4, and it is not necessary to put a large amount of processing information on a data packet to transfer it from program storing unit 102 to operation processing unit 106. Accordingly, in operation processing unit 106, various processes can be performed extremely flexibly as compared to a conventional data driven type information processing apparatus. Also, when describing a data flow program, operation with a high function can be handled like basic operation, so that the program producing work is considerably simplified.

The relation operations executed in the embodiment shown in FIGS. 1 and 2 include various ones in addition to the join operation shown in FIG. 39. Some other examples of the relation operation are shown below.

(1) Direct production operation (product)

The direct production operation is an operation of connecting all the elements of structural data A and structural data B in combination as shown in FIG. 5A.

(2) Restriction operation (restriction)

The restriction operation is an operation of taking out a particular item element from certain structural data as a key as shown in FIG. 5B.

(3) Union operation (union)

The union operation is an operation of connecting structural data A and B when contents of items of structural data A and B satisfy certain conditions (for example, when they agree).

(4) Projection operation (projection)

The projection operation is an operation of producing new structural data by extracting a particular item from certain structural data as shown in FIG. 5D.

The above-described relation operations are all described in the data flow program in program storing unit 102 as high function instructions and executed in high function instruction processing unit 109.

Next, a program developing system configured using a data driven type information processing apparatus of the present invention will be described. Now, it is pointed out in advance that the program developing system described below is a completely new program developing system developed with objects of enabling a user to perform a single specification definition using a plurality of languages involving plural aspects to provide software developing environment with excellent understandability, descriptiveness and operability, and also of converting and executing the desired software system into an executable program to enable simulation and execution of the produced program.

Figure 6:
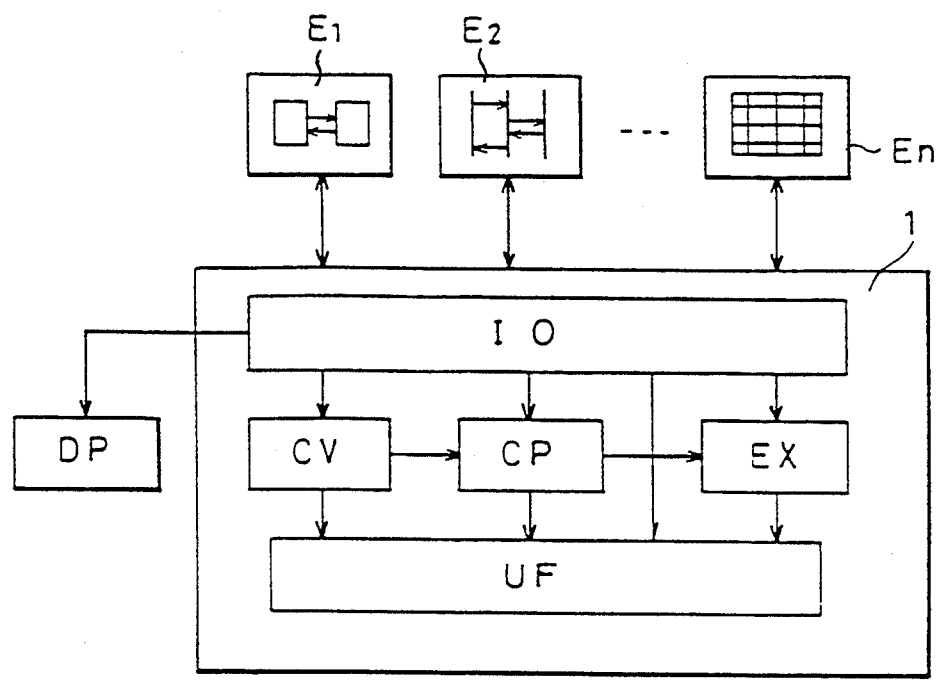
FIG. 6 is a diagram schematically showing structure of the entirety of a program developing system configured using a data driven type information processing apparatus of the present invention.

FIG. 6 is a diagram schematically showing the structure of the entirety of the program developing system configured using a data driven type information processing apparatus of the present invention. The program developing system shown in FIG. 6 includes graphic editors E1-En provided with rendering and editing functions according to different representation formats, and a main apparatus 1 for producing programs according to specification descriptions provided from users. Each of graphic editors E1-En is preferably implemented in a separate and independent process. Each of graphic editor E1-En is communicatable with main apparatus 1. Why each of graphic editor E1-En and main apparatus 1 are communicatable with each other is that processes of respective graphic editors E1-En and main apparatus 1 are coupled by inter-process communication using sockets, for example, in consideration of the facility of the program development and future function expansion.

The representation formats provided by the graphic editors E1-En include graphic representation formats and non-procedural description formats. The graphic representation formats include representation formats such as a function block diagram, a sequence chart and the like.

Figure 7:
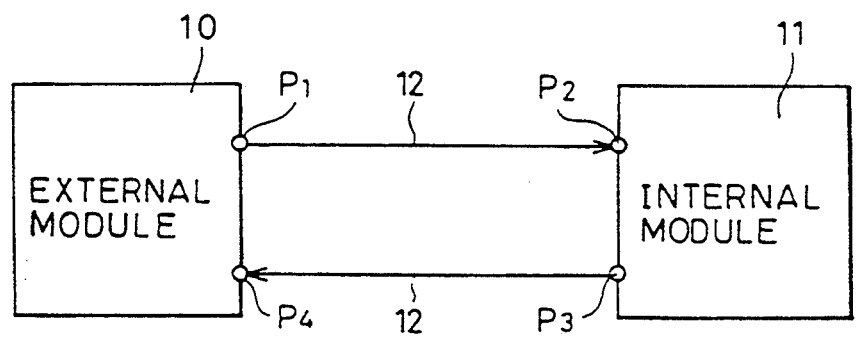
FIG. 7 is a diagram illustrating a function block diagram which is one of specification description representation formats used in the program developing system shown in FIG. 6.

The function block diagram is, as shown in FIG. 7, a representation format representing the connection relationship between modules (module is a certain unit semantically united in the software).

FIG. 7 is a diagram showing one example of the specification description format using a function block diagram. In FIG. 7, the data connection relationship between an external module 10 and an internal module 11 is shown. External module 10 is a module for representing an external function which is not an objective of the specification description. Internal module 11 is a module for representing a function which is an objective of the specification description. Between external module 10 and internal module 11, data flow is defined together with input and output ports P1-P4 by data arcs 12.

The internal module 11 includes primitives, and parts (a part is partially completed specification description, which is registered in a file).

The sequence chart is a diagram showing the causal relation in input and output of data, the relation of transmission and receipt of data between modules, and the like as shown in FIG. 8. In FIG. 8, the data flow between external module 10 and internal module 11 is shown. In this sequence chart, a module and the ports are designated by a single sequence line (a vertical line). The sequence line indicates a time axis and also shows the relation in a time sense of signal flows. The flow of data between modules 10 and 11 is indicated by signal lines 13. The signal lines 13 show the connection and causality of data between the modules.

The non-procedural description forms include the representation formats shown in table form such as a relation table and a determination table. The relation table shows relation data structure as shown in FIG. 9. In FIG. 9, The relation table includes a field 14 in which a title of the table is indicated, an item name field 15 in which titles indicating items included in this table are displayed, a field 16 showing a type (int (an integer), float (a floating point) and string (a string)) of the data of the item, and a field 17 in and from which actual data values of the items are inputted and outputted.

A determination table is a representation format indicating the selection structure of a process as shown in FIG. 10. More specifically, the determination table shows in a table the selection structure of data or control, indicating that a function takes what value for a certain data value, for example. In FIG. 10, the determination table includes a field 18 displaying a determination table module name, a field 19 displaying a determination condition, a field 20 displaying a name of a process to be executed as a result of the determination, a field 21 displaying determination for the condition, and a field 22 displaying determination indicating execution and nonexecution of the process based on the condition determination.

In addition to the above-mentioned representation formats, available representation formats include a data block diagram showing the inclusion relation of data, a table manipulation diagram showing the structural data process mainly including relation operations and the like.

Figure 12:
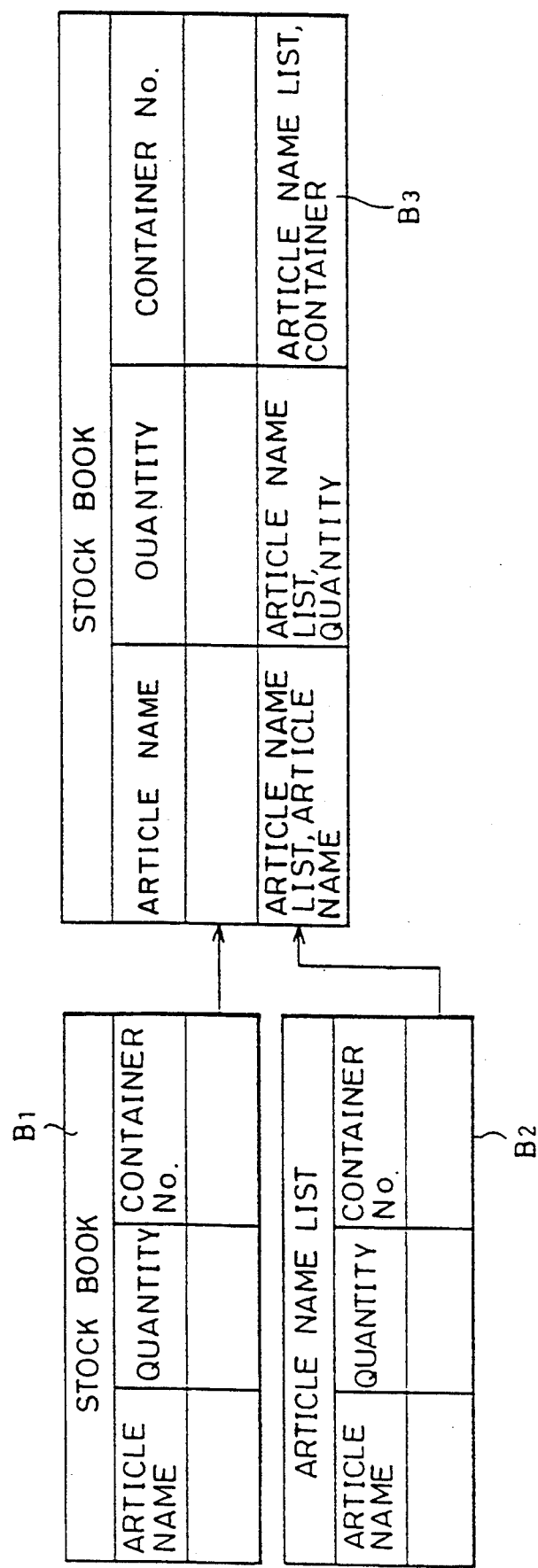
FIG. 12 is a diagram illustrating a table manipulation diagram which is one of specification description representation formats available in the program developing system shown in FIG. 6.

One example of a representation format by a data block diagram is shown in FIG. 11, and one example of the representation format of the table manipulation diagram is shown in FIG. 12.

In FIG. 11, the data block diagram includes a data set name field 23, a field 24 indicating the number of entries included in the data of the field 23, a field 26 indicating names of member data composing the members or the data set names at lower levels of the data set in the field 23, and a field 25 indicating data types (int, float, string, struct) of the member data. The field 25 is described only when the data is of the array structure. When the data type is "struct", it shows the data is made hierarchical for the lower levels. As to each data, the connection relation is shown by an AND connection 27 or an OR connection 28. That is, a data block diagram is a diagram showing the hierarchical relation, inclusion-/exclusion relation and the like of the data handled in the system.

The table manipulation diagram shown in FIG. 12 shows a state in which the relation tables B1 and B2 are processed according to a predetermined manipulation to form a new relation table B3. The manipulation is called as union manipulation. The manipulations in a table manipulation diagram include not only the union manipulation, but also various relation operations, sort operations and calculation operations. The relation operation is operation for manipulating a table so that it satisfies a certain relation. The sort operation is a manipulation of re-arranging the rows of a table according to a predetermined order such as the order of alphabets, the order of magnitude of values. The calculation operation is a manipulation for obtaining calculated results such as a total value, an average value and so forth for a particular column of the table.

Returning to FIG. 6, main apparatus 1 includes a mutual conversion unit CV for fusing information obtained from graphic specification descriptions which a user produced employing graphic editors E1-En, to produce construct information containing control information necessary for program execution. The mutual conversion unit CV also performs mutual conversion of information among graphic specification descriptions having different representation formats and production of basic information among module levels for presentation to a user. The main apparatus 1 also includes an execution unit EX for interpreting and executing a program according to the construct information produced in the mutual conversion unit CV and presenting to a user the execution results, an input/output unit IO for managing communication for information exchange among graphic editors E1-En for the graphic specification description, the mutual conversion unit CV, the execution unit EX, the parts management unit CP, and a unified file management unit UF for managing in an unified manner the data structures handled by respective processing units EX, CV and CP.

The parts management unit CP registers a certain partly completed specification description in the software as a "part" and also manages the operation for reutilizing the registered "parts".

The construct information is information obtained by converting produced specification description information so that it corresponds to the operation method of a process model, including control structures. As the process model, a data driven model is employed as an example. For using the data driven model as the processing model, a control node and a control arc must be produced. As to the construct information, a node is associated with a module of specification description information and an arc is associated with data connection between modules.

The input/output unit IO has functions as an interface for a user, of the execution control of respective processing units on the basis of an instruction by the user, and of managing data transmitted and received among respective processing units.

The interface to the user includes the following; (1) the specification description according to a representation format employing a graphic editor, (2) display of mutual conversion result, (3) a mapping function, (4) a citation function, (5) a prototyping function, (6) parts registration and reutilization, and (7) output of documents.

The description of specification by each representation format using a graphic editor may include the following methods.

(a) A user specifies a type of a representation format and a specification description name. The specification description name is specified when reusing the specification description already registered, and a new specification description name is inputted for a new production.

(b) For detailing the specifications already described or under description hierarchically, a graphic element and a representation format are specified within an existing specification description. In this case, the specification description is made using a representation format corresponding to the specified graphic element.

The specification description can be made with different representation formats for the same module. In this case, the mutual conversion unit CV informs an editor of the corresponding representation format according to retrieval to a rule table for mutual conversion therein, and the corresponding converted representation format is displayed for the user. Since the description of a single specification can be made with different representation formats, the described contents can be easily understood on many aspects, enabling production of more complete specifications.

The mapping function is a function of relating semantically equivalent information (e.g., data and data or a function module and a function module) among different representation formats. This function is needed for relating various specification information described independently with each other for sequential unification.

Figure 13:
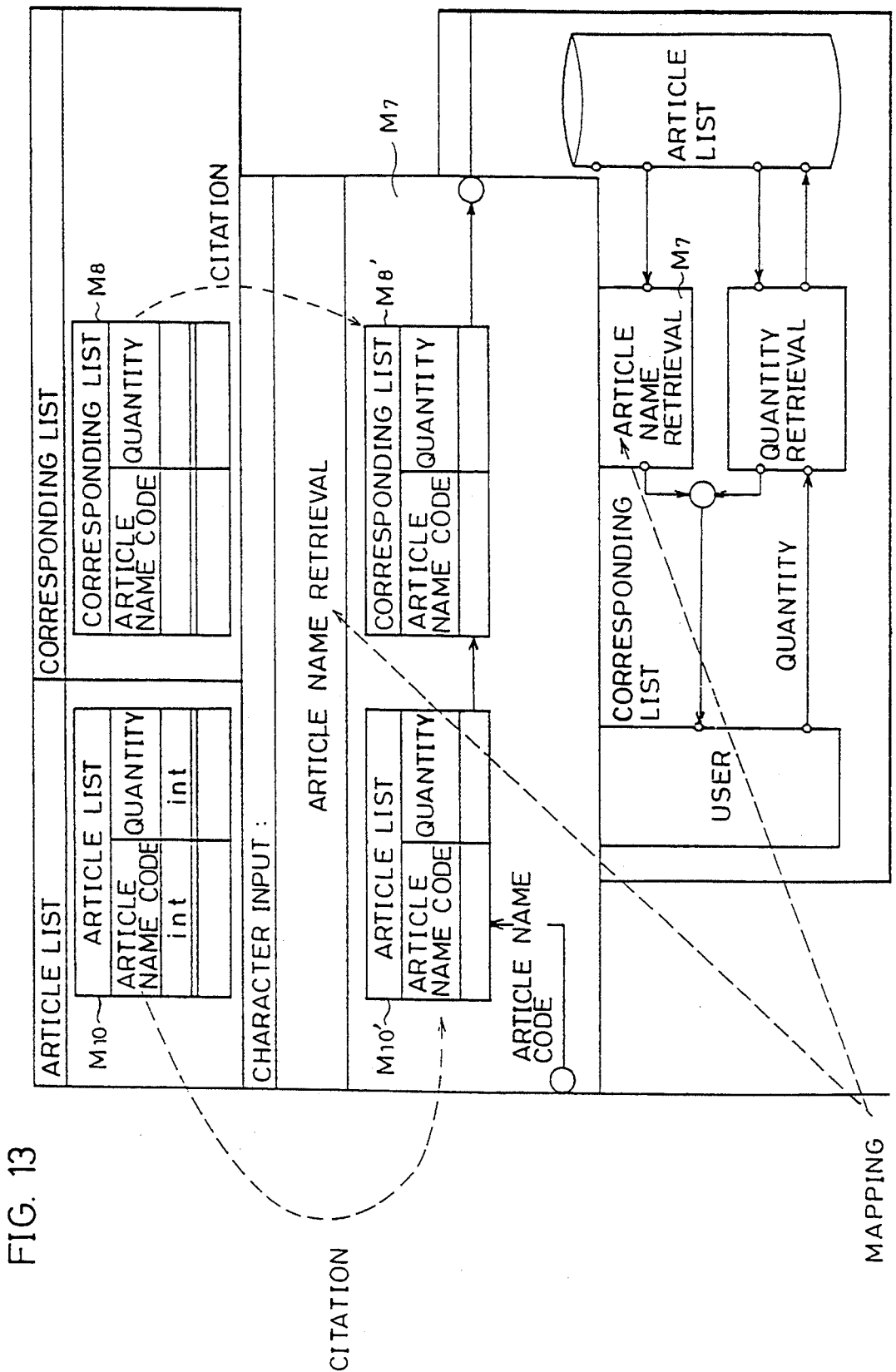
FIG. 13 is a diagram illustrating "citation" and "mapping" manipulations in performing specification description using a plurality of representation formats.

As shown in FIG. 13, the module M7 represented by a function block diagram can also be expressed using a table manipulation diagram. The module M7 represented by the table manipulation diagram and the module M7 by the function block diagram are semantically equivalent to each other. In this case, the modules M7 represented in different representation formats are related as semantically identical, as shown by the arrows in FIG. 13. This manipulation is referred to as "mapping" manipulation.

Information may be shared between different representation formats. In this case, citation of the already described specification information, in description of a specification in another representation format, can reduce the amount of work in the description. To use information described in a certain representation format in another representation format is referred to as "citation". For example, as shown in FIG. 13, the module M10 shown by a relation table is identical to the table (module) M10' represented by a table manipulation diagram. In this case, as shown by the arrows in the same figure, the module M10 of the relation table is cited in description according to the representation format of a table manipulation diagram. Similarly, a table M8 in the table manipulation diagram is the same as the module M8' represented by a relation table. Also, in this case, the module M8 represented by the relation table is cited in description according to the representation format of the table manipulation diagram.

The prototyping function is a function for verifying execution results of partly completed specification description. In the prototyping, the execution results of the specification description can be verified independently for each level. The specifying of the input and output data and production of input data in the prototyping are made by a user in accordance with the specified data structure.

An interface for part registration and reuse instructs the parts management unit CP to register parts and reutilize the registered parts.

With the function of outputting documents, for specification descriptions described in different representation formats, each graphic specification description described in each respective representation format is outputted to a printer as a hard copy which is available as a design document of the software as it is.

Next, referring to FIG. 6, an interface between input/output unit IO and each processing unit will be described. First, each interface with each graphic editor will be described.

Input/output unit IO controls the starting and ending of various kinds of graphic editors specified by a user. Also, it manages information necessary in activation (starting) and finish (ending) of editors such as names of inputted specification description and types of graphic editors. The operations therefor include the following.

(a) When the user specifies a type of representation format and a name of specification description, input/output unit IO activates a graphic editor corresponding to the specified representation format and also simultaneously sends the name of the specified specification description to the activated graphic editor.

(b) Each graphic editor has a function for activating other graphic editors therein. Of the types of graphic elements (graphic elements included in manipulation tools displayed by an editor) specified in a certain editor and a representation format is informed input/output unit IO. A graphic element has symbols different in kind and shape depending on the used type of the representation formats. Input/output unit IO activates a graphic editor corresponding to the specified representation format and also sends the specified graphic element to the activated graphic editor.

(c) Finish control of specification description. Each graphic editor has a manipulation tool for finish. The manipulation tool for finish informs input/output unit IO of finish of the graphic editor. Input/output unit IO effects termination of the graphic editor of which termination is informed of after reserving information such as the name of a produced specification description and the type of the editor in response to the finish informing.

Input/output unit IO also provides interfaces between graphic editors E and mutual conversion unit CV. When a specifications is described employing various representation formats, or when a plurality of specification descriptions are correlatively employed, input/output, unit IO performs following processes between graphic editors E and mutual conversion unit CV.

(a) The rendering information described by a user is sequentially transmitted to mutual conversion unit CV through input/output unit IO at the stage where each graphic element is described. Mutual conversion unit CV performs predetermined processes (which will be described latter) according to the information supplied from the input/output unit IO, and then returns the processed information to input/output unit IO. In this case, the returned data includes specification information representable in different representation formats corresponding to the inputted specification description information. The data returned from the mutual conversion unit CV includes an identifier ID of the specification description of the returning destination together with the processed result. Input/output unit IO identifies specification description corresponding to this identifier ID and returns the processed result formed by mutual conversion unit CV to a graphic editor which is the transfer target. Also, if mutual conversion unit CV detects contradiction in the inputted specification description, a message indicating the contradiction detection is presented to the user by input/output unit IO.

(b) Regarding two graphic elements specified by the user on two graphic editors in a specification description process, input/output unit IO makes a determination as to whether the two graphic elements can be logically mapped or not. If the mapping is possible, the input/output unit IO returns identical logical specification information to both of the two graphic editors. If the mapping is impossible, it presents a message indicating the mapping impossibility to the user.

(c) Citation

Upon citation of a specification information among a plurality of graphic editors, input/output unit IO transfers rendering information and specification information of the graphic elements specified by the user on graphic editors to a graphic editor which is a destination of the citation.

Next, an interface between input/output unit IO and an execution unit EX will be described. Input data information and positional information of input and output data necessary in execution (e.g. prototyping) by execution unit EX are transferred from a graphic editor to input/output unit IO similarly to that in specification description. Input/output unit IO hands such information to a handler (not shown) for execution which performs preprocess of the execution. When the pre-process is terminated, the execution unit EX is activated in response to an execution start instruction by the user. Data of the execution result is displayed on display unit DP through input/output unit IO from the above-mentioned handler for execution. The display on display unit DP is executed by activating a routine for output result display, for example.

The interface between input/output unit IO and parts management unit CP includes the following.

(a) Interface in parts registration

At the stage where the specification description produced by a user is partially completed, the specification description information and parts name which are registration objectives specified by the user are transmitted to parts management unit CP through input/output unit IO.

(b) Interface in parts reuse

The parts name specified by the user on a graphic editor is transmitted to parts management unit CP through input/output unit IO. Parts management unit CP retrieves parts information corresponding to the applied parts name through the management unit UF and returns the retrieved parts information to an activated graphic editor through input/output unit IO.

When a user wants to make reference to the parts information, input/output unit IO activates a parts specification display routine under an instruction from the user to display the graphically represented parts information on display unit DP.

The function of mutual conversion unit CV will be described. The mutual conversion unit CV has a function of unifying the contents of the specification description described by the user using various graphic representation formats to generate a program in an effective execution format and also of converting the information obtained on a particular aspect (a representation format or level) of a supplied specification description into another representation format. Here, the execution format program is a program obtained by converting construct information having a structure depending on the process model (a data driven type model) so as to match with an execution format of a virtual machine.

Figure 14:
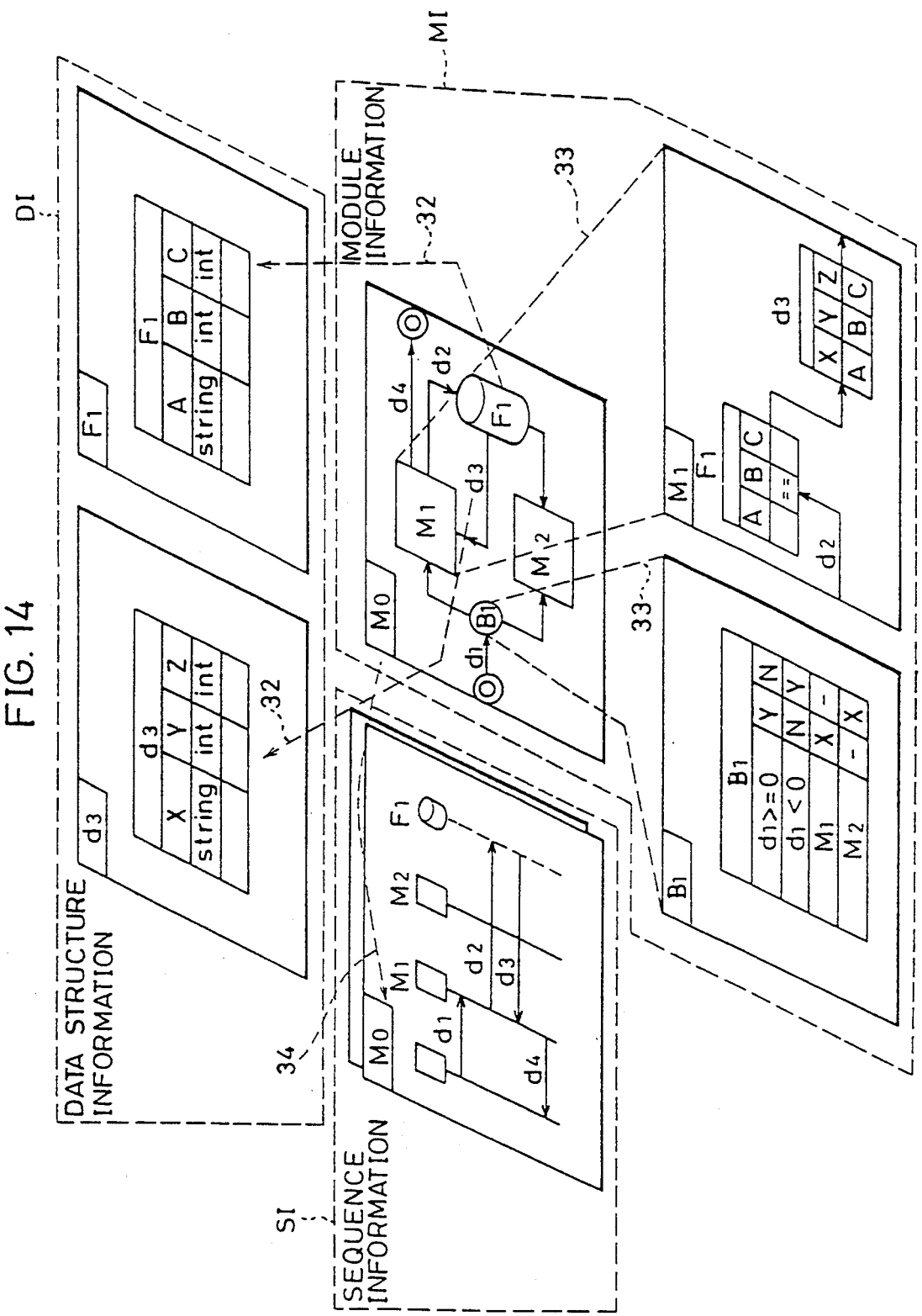
FIG. 14 is a diagram showing one example of structure of specification description information produced in the program developing system shown in FIG. 6.

One example of the structure of specification description information unified by mutual conversion unit CV is shown in FIG. 14. The specification description information includes module information MI, sequence information SI and data structure information DI.

The module information MI is information related to operation of individual module constituting the software system and data connection among modules. The module information generates hierarchical relationship among respective modules on the basis of the specification description with a function block diagram. The module information also unifies data structure information through data connection relationship among modules. The module information includes information about a function module, a determination table module and a structural data manipulation module, respectively. The information of modules respectively correspond to processed contents which can be defined in each representation format of a function block diagram, a determination table and a table manipulation diagram represented by graphic editors. Each module will be described below.

(A) Function Module:

The function module includes information of internal sub module constituting a module and information related to data connection relationship among sub modules. The attribute of sub module information corresponds to a description element provided by a function block diagram, which includes primitive, parts, internal module, file, branch, and confluence. The hierarchical structure of a module is reserved by applying a submodule ID (identifier) attached to a module of which detailed information is defined by the sub module.

The data connection relationship among modules is made corresponding to arcs in a function block diagram. The arc indicates relationship between data producing sub module and data consuming sub module. The data structure is managed in a manner so that the data structure information is referred to with data set ID.

(B) A determination table module is information indicating information related to a selection process by a process implemented according to the condition determination and the determination result on the basis of the information obtained from a determination table.

The relation between contents of each conditional determination and a corresponding process to be executed is managed by an event ID.

(C) The structural manipulation module information is information indicating with objective data of a manipulation and manipulations operating upon each data the information related to the structural data manipulation on the basis of the information obtained from a table manipulation diagram. The correspondence relation between the objective data of the manipulations and each manipulation is managed by data IDs and manipulation IDs. The data structure of each data is managed in a manner of referring to the data structure information by the data set ID.

The data structural information is information related to the definition of type and structure of data consumed and produced in the software system. The hierarchical relation of a data structure is produced on the basis of the description employing a data block diagram. The data structure information includes inclusive data structure information and relation data structure information, and also includes atom information as data having no structure.

(A) The inclusive data information is information indicating structure of data in inclusive or exclusive relation. The inclusive data information has a data set ID to be given to a data structure defining a detailed structure fop each component data to reserve the hierarchical relation of the data structure.

(B) The relation data structure is information indicating basic data type of each item data constituting the relation data.

(C) The atom information is information indicating a basic data type (int, float, string) related to an atom data.

The sequence information includes information about the attribute of a sequence line and a signal line inputted to and outputted from the sequence line. In the sequence information, a plurality of sequences can be defined for a single module, so that the relation thereof is managed by a sequence ID.

(A) The sequence line information is information indicating the attribute related to a vertical line indicating a sub module in a sequence chart. The attributes of sequence lines include an internal module, file, each of which corresponds to a description element of the sequence chart. The corresponding relation to sub modules in the module information is managed with module sub IDs.

(B) The signal line information is information showing data connection (hereinafter, referred to as a signal line) among sequence lines in the sequence chart. The signal line information also shows the causal relation of input and output data by managing information of a group of output sequences simultaneously outputted in connection with inputs of a signal line. The corresponding relation to the data dependency in the module information is managed by arc ID.

As described above, the relationship between pieces of information at respective portions constituting the specification description information is all managed with identifier IDs. The identifier ID includes, as described above, data set ID identifying data structure information, module ID identifying module information, module sub ID identifying an internal sub module constituting a module, arc ID identifying data connection among internal sub modules. Every time addition of new information occurs, mutual conversion unit CV produces new identifier ID for management.

As shown in FIG. 14, in the constitution of specification description information, specification contents described employing a plurality of graphic editors are made hierarchical and also include data reference relation 32, module hierarchical relation 33 and common definition information relation 34 for the same module. Accordingly, on the basis of such relations, the specification description information of the entirety of the objective software system can be produced from a partial specification description defined in a plurality of different representation formats.

The specification description information integrating each information obtained by the individual representation format is managed with identifiers IDs as described above. Examples of the data structure of the specification description information obtained by unifying information obtained from such individual representation format is shown in FIGS. 15 through 20.

Figure 15:
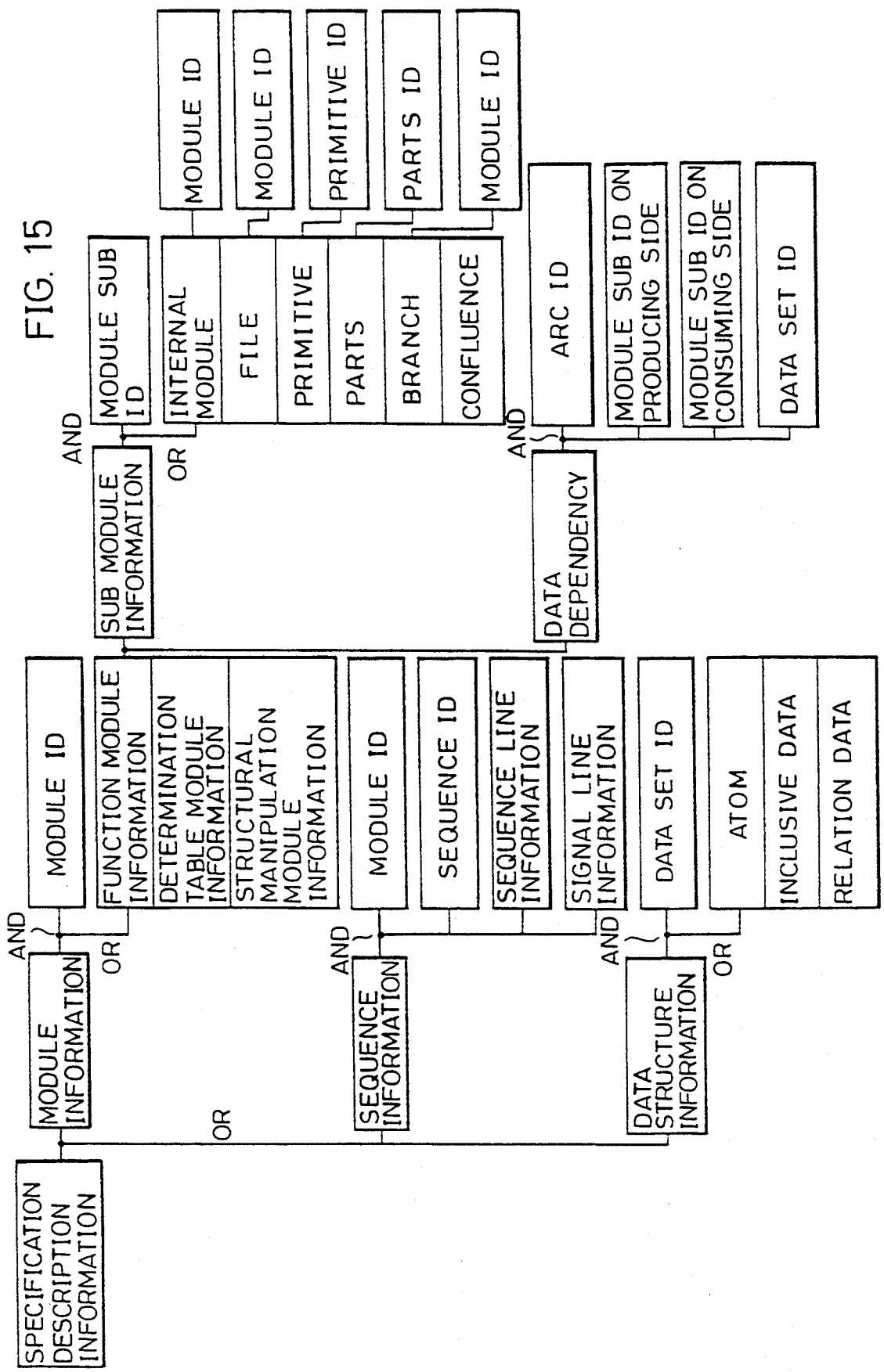
FIG. 15 is a diagram showing in a list the structure of specification description information used in the program developing system shown in FIG. 6.
Figure 16:
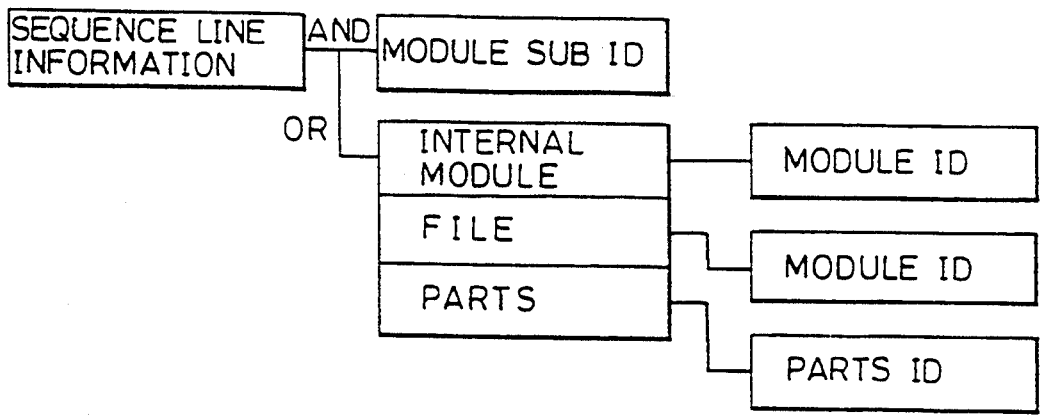
FIG. 16 is a diagram showing structure of sequence line information included in the specification description information.
Figure 17:
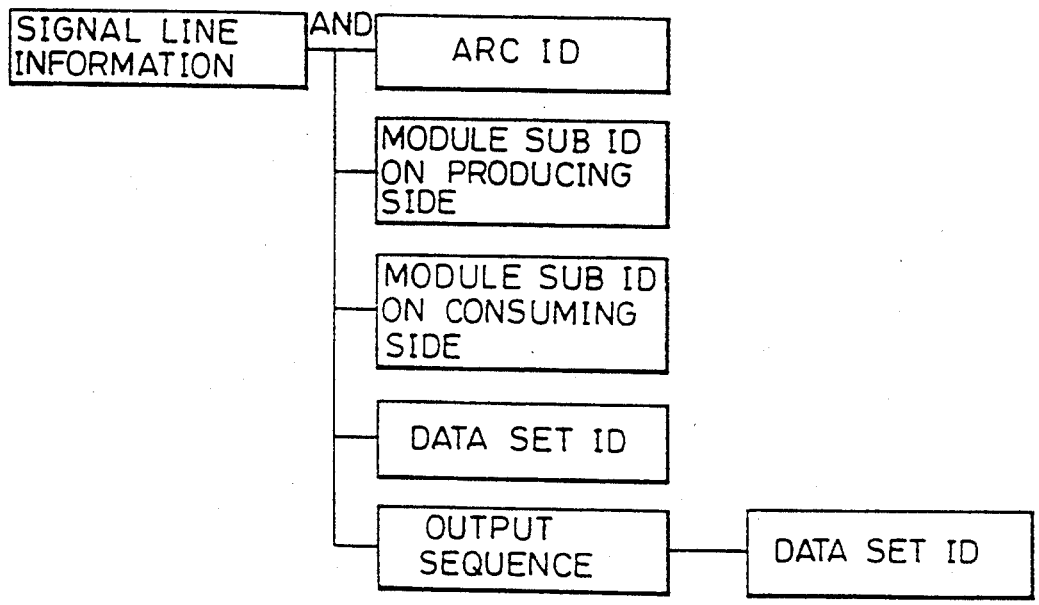
FIG. 17 is a diagram showing structure of signal line information shown in FIG. 15.
Figure 18:
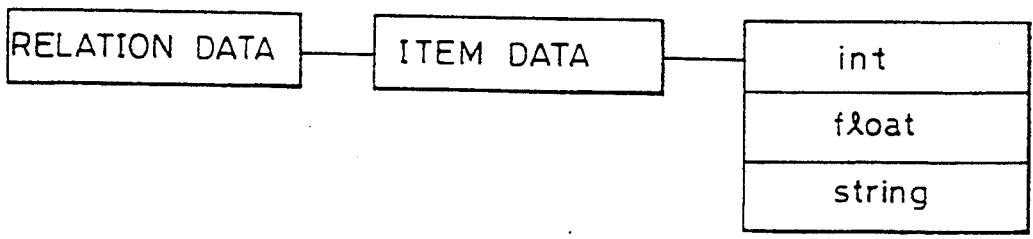
FIG. 18 is a diagram showing structure of relation data shown in FIG. 15.
Figure 19:
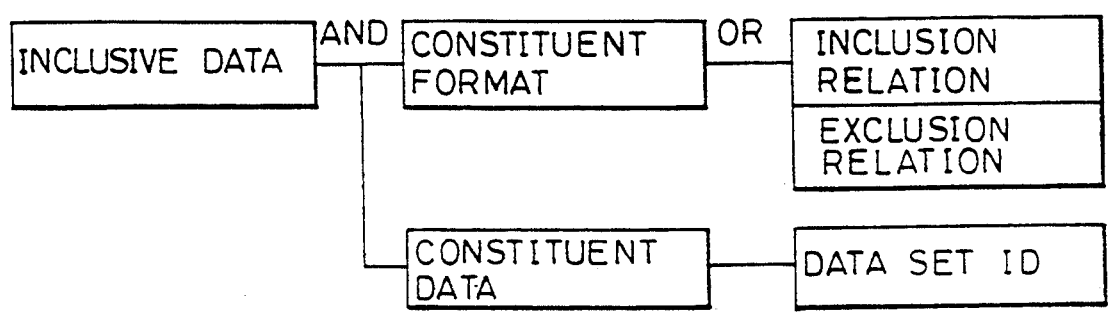
FIG. 19 is a diagram showing structure of the inclusive data shown in FIG. 15.
Figure 20:
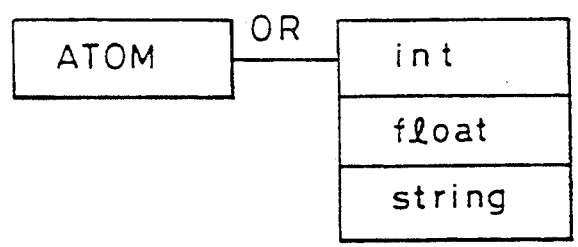
FIG. 20 is a diagram showing structure of atom shown in FIG. 15.

FIG. 15 shows a data structure in specification description, FIG. 16 shows a structure of sequence line information, FIG. 17 shows a structure of signal line information, FIG. 18 shows a structure of relation data, FIG. 19 shows a structure of inclusive data and FIG. 20 shows a structure of atom. In the structures of specification description information shown in FIGS. 15 through 20, by referring to the identifier ID attached to each information, correspondence/in correspondence and modification/no-modification are determined.

Figure 21:
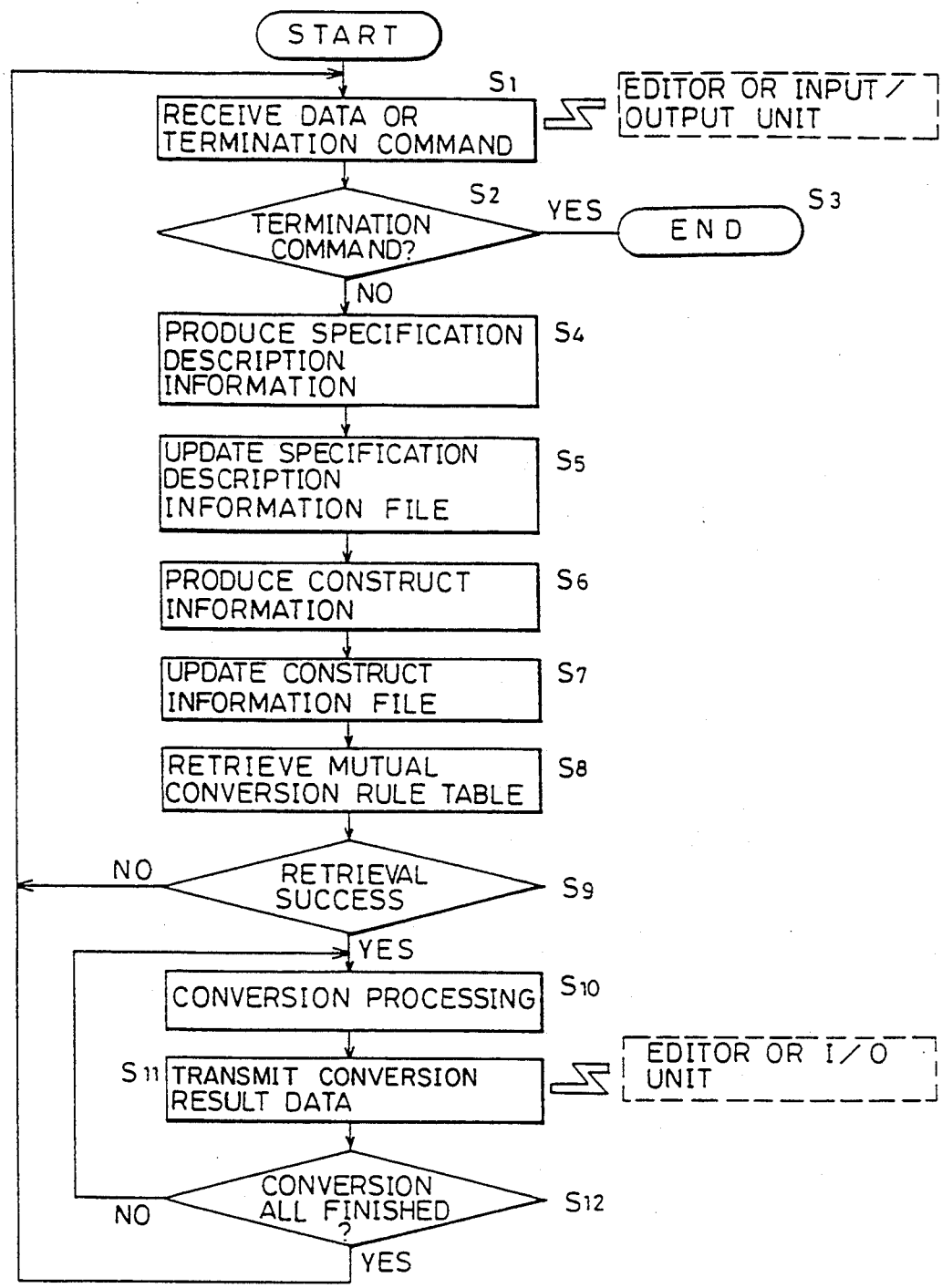
FIG. 21 is a flow diagram showing operation of a mutual conversion unit in the program developing system shown in FIG. 6.

FIG. 21 is a flow chart showing operation of a mutual conversion unit. Referring to the operation flow chart of FIG. 21, the operation of mutual conversion unit CV will be briefly described below. The generation of specification description information is done on the basis of the communication with an editor through input/output unit IO.

In step S1, data is supplied from an editor E or the input/output unit IO. The data is specification description information, termination command information, or specification description production start information. If the supplied information is determined to be the termination command (step S2), the mutual conversion unit CV performs a desired process such as closing of a file, and then the operation is terminated.

If the supplied data is not termination command, mutual conversion unit CV produces necessary specification description information according to the supplied data (step S4). An access is made to file management unit UF employing the produced specification description information, and the contents of the file for the specification description information are updated by the produced specification description information (step S5).

On the other hand, mutual conversion unit CV produces construct information from the supplied specification description information (step S6). As for the produced construct information, management unit UF again, and the construct information file is updated through addition or modification of the newly produced construct information by accessing the file.

Next, mutual conversion unit CV retrieves the rule for conversion previously stored in a form of a table. By the retrieval to the rule table for conversion, a determination is made as to whether there exists data having the identical meaning to that of the input data. That is, it is analyzed whether information received from a certain editor can be converted into an object in another graphic representation format (the correspondence relation of a module of a function block diagram and a vertical line of a sequence chart, for example) (step S9).

When an object convertible into another representation format is retrieved by the analysis, it is converted into the convertible corresponding graphic object (step S10), and the data indicating the converted graphical object obtained as a result of the conversion is transmitted to a corresponding editor through input/output unit IO (step S11). The editor receiving the data transmission is an editor capable of representing the converted object. After the conversion process is all finished (step S12), mutual conversion unit CV waits for transmission of semantically completed graphic object from the editor or the input/output unit again.

If no convertible graphic object exists in step S9, mutual conversion unit CV informs input/output unit IO of the fact and waits for the data from an editor E or input/output unit IO.

If a single graphic object semantically completed is updated when data is inputted as a result of specification description by a user through input/output unit IO, the single completed graphic object is transmitted to mutual conversion unit CV.

When a convertible graphic object is retrieved in step S9, if a plurality of convertible graphic objects exist, graphic editors providing representation formats corresponding to the plurality of graphic objects respectively are activated. The graphic elements of respective representation formats provided by the simultaneously activated graphic editors are simultaneously displayed on display unit DP with multiwindows, for example.

Figure 22A:
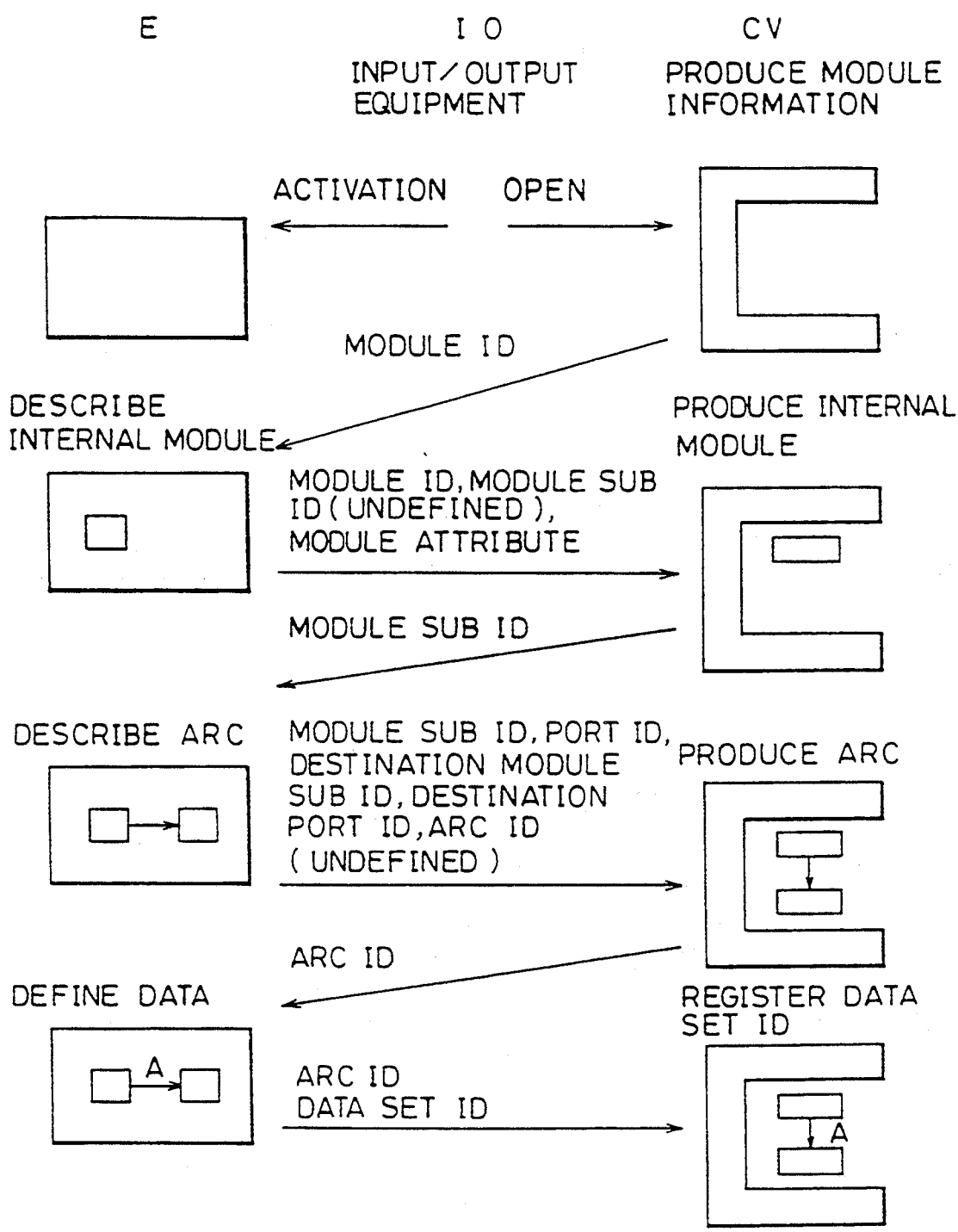
FIGS. 22A and 22B are diagrams illustrating data transmission/receipt sequence between a graphic editor which is specification description representation means and a mutual conversion unit.
Figure 22B:
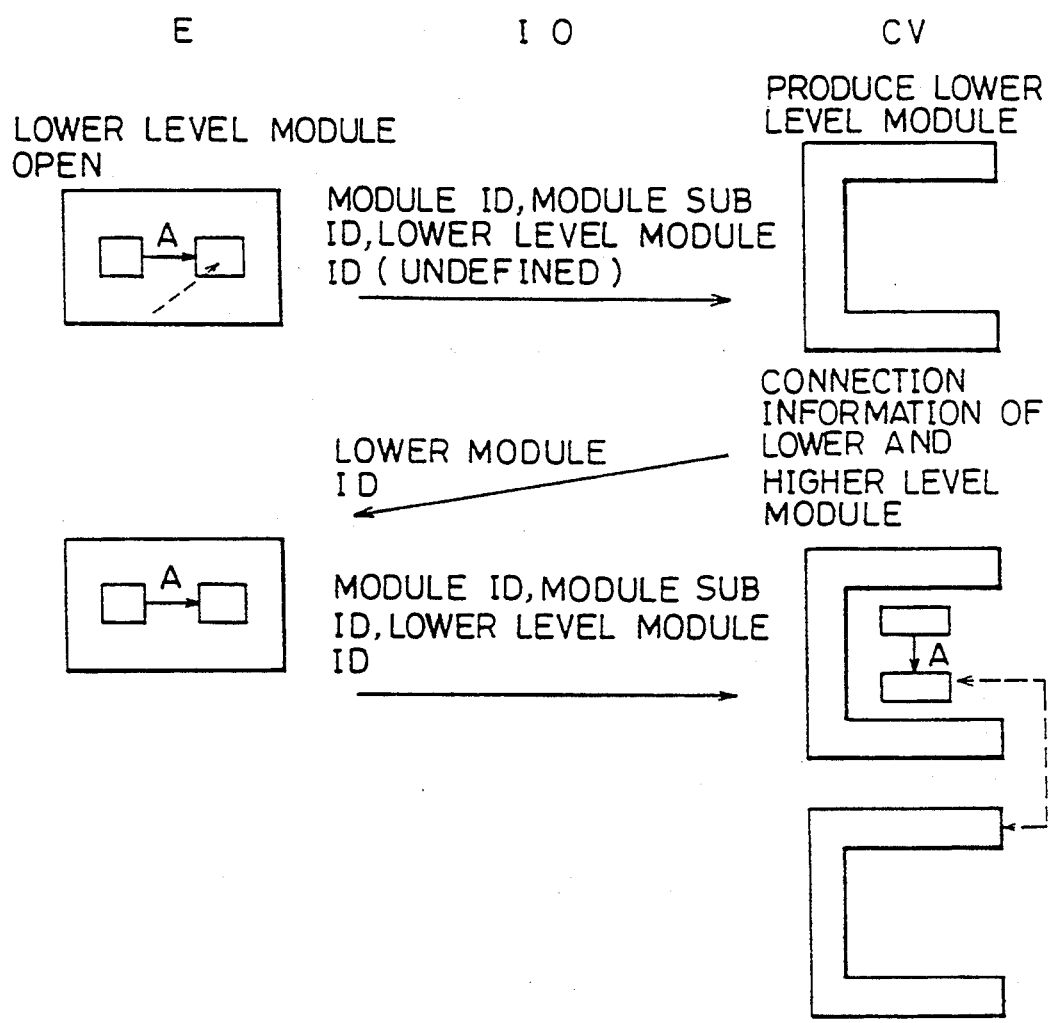

Next, an example of information exchange between graphic editor E and mutual conversion unit CV will be described referring to FIGS. 22A and 22B. In the example shown in FIGS. 22A and 22B, a case is described as an example in which a graphic editor with a function block diagram as a representation format is activated and mutual conversion unit CV produces specification description on the basis of the representation format of the function block diagram.

In response to the activation of an editor for the data structure definition or the module definition made by a user through input/output unit IO, mutual conversion unit CV produces new module information or data structure information. A type of the produced module or data is determined from a type of the activated graphic editor. Simultaneously, for such produced module information or data structure information, mutual conversion unit CV produces a module ID or a data set ID and transmits it to the activated graphic editor. In FIG. 22A, the module ID is transferred to the graphic editor E.

In the graphic editor E, when the user adds a new internal module on the editor, the graphic editor E transfers undefined module sub ID to mutual conversion unit CV together with the transferred module ID and information indicating the attribute of the module. Mutual conversion unit CV produces an internal module in response to the received undefined module sub ID and also produces and transfers to the graphic editor E module sub ID for identifying the new sub module information.

In the graphic editor E, if modification or elimination of information about the existing internal module in the function block diagram is done, the modification or elimination information is transferred to mutual conversion unit CV together with corresponding module sub ID. Mutual conversion unit CV modifies or eliminates the corresponding sub module information in response to the transferred information.

When a plurality of internal modules are produced, an arc indicating the connection relation of data among the internal modules is described on the graphic editor E. In response to that, the graphic editor E transmits to mutual conversion unit CV a module sub ID identifying a module which transmits data, a port ID indicating a data output port of the internal module, a module sub ID of a destination module for receiving data, a destination port ID which identifies a port at which the destination module receives the data and an undefined arc ID. Mutual conversion unit CV produces an arc in the internal module in response to the received information, and also adds predetermined information to the transferred undefined arc ID and transmits it to the graphic editor E as arc ID for identifying the arc. Next, when the data structure for the arc to be identified with the arc ID is specified, the graphic editor E transmits a data set ID indicating the specified data structure together with the corresponding arc ID to mutual conversion unit CV. Mutual conversion unit CV registers the data set ID according to the received information. Next, referring to FIG. 22B, operation for producing a module of hierarchical structure will be described.

For an existing internal module in a function block, when a user activates another graphic editor to define details of the existing internal module, a lower level module ID (undefined) for identifying a module to be newly added is responsively transmitted to the conversion unit CV together with module ID and module sub ID from the activation source graphic editor which causes the activation of another editor. The conversion unit CV produces new module information in response to the supplied information and also adds the module ID of the higher level module at that time to the produced module (the lower level module). Thus, the lower level module ID is determined.

The module ID of the produced module (the lower level module) is transmitted to the activated editor for defining the details and also transmitted to the editor which causes activation. Subsequently, when the description for the lower level module is completed, the module ID, module sub ID and the lower level module ID are transmitted to mutual conversion unit CV together with the information for indicating the completion from the activated graphic editor. Conversion unit CV produces combined information of the higher level module and the lower level module in response to the supplied information. Information of module ID corresponding to the lower level module is transmitted to mutual conversion unit CV according to the sequence of the internal module information modification from the graphic editor causing the activation. Thus, the hierarchical structure of the module information is implemented as reference relation from both of the higher level and the lower level sides by the identifier ID.

The reference relationship between data and data structure information in the data dependency of a manipulation is implemented as described below. On mapping manipulation in a plurality of graphic editors, the correspondence relationship between an arc and data structure description is established, and then the data set ID obtained at that time is transmitted to mutual conversion unit CV according to the sequence of modifying the data dependency information. Thus, the structure of input and output data in a module is reserved, which enables extraction of the access sequence to and the locking range of the structural data.

As described above, in all the specification description information forming each module, the relationship among each piece of part information is managed by managing the identifiers ID.

An example of production of specification description of the entirety of a software system by the hierarchical representation will be described.

Figure 23A:
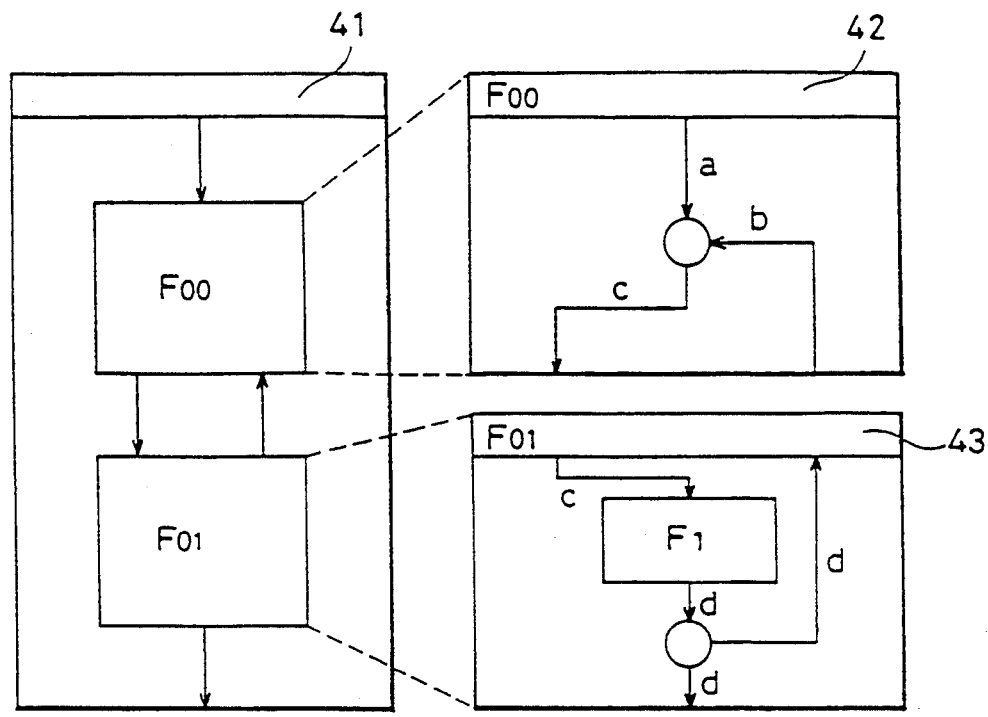
FIGS. 23A and 23B are diagrams illustrating manners of producing the construct information from combinations of a plurality of graphic representation formats.
Figure 23B:
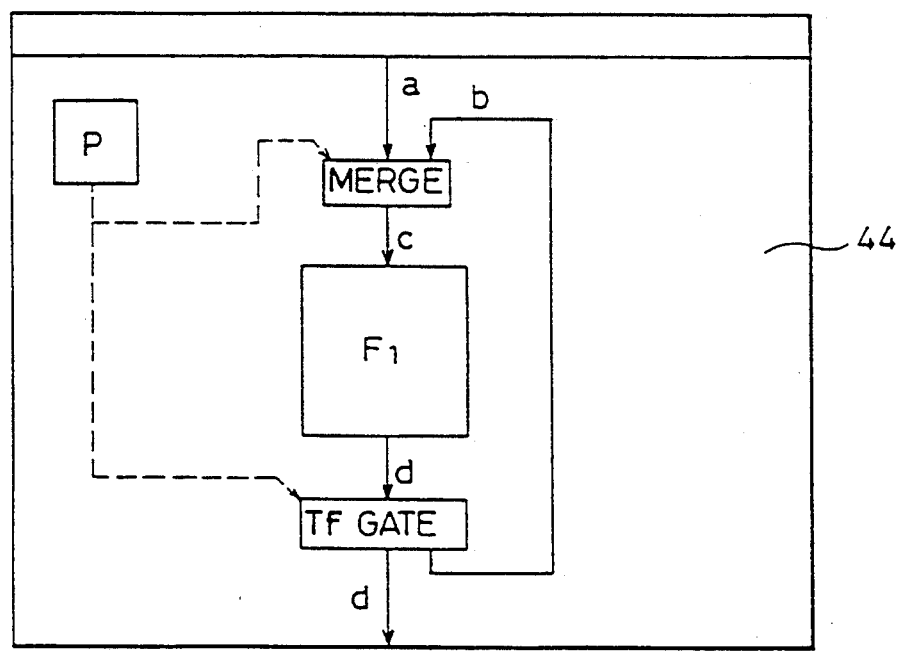

FIGS. 23A and 23B are diagrams illustrating an example of the case of producing more precise module information from hierarchical structural information. As shown in FIG. 23A, detailed descriptions 42 and 43 by the lower levels of each module are formed for contents represented as the transmission and reception relation of data between module F00 and module F01 in the specification description 41 of the higher level. By associating them in mutual conversion unit CV (FIG. 23B), the structure is analyzed in which module F00 merges data a and data b to derive data c, while module F01 receives data c and outputs data d and also returns the output d to module F00. In this way, a repeating structure 44 can be extracted in which the input data b and output data d of the function modules are identical data and the data d is repeatedly utilized again.

In FIG. 23B, the function module indicating "merge" and "TF gate; truth/false determination gate" intactly transmitting data are operationally controlled by function module P. As to the control contents, the details of the control contents become clear by employing lower level modules for the function module P.

Figure 24A:
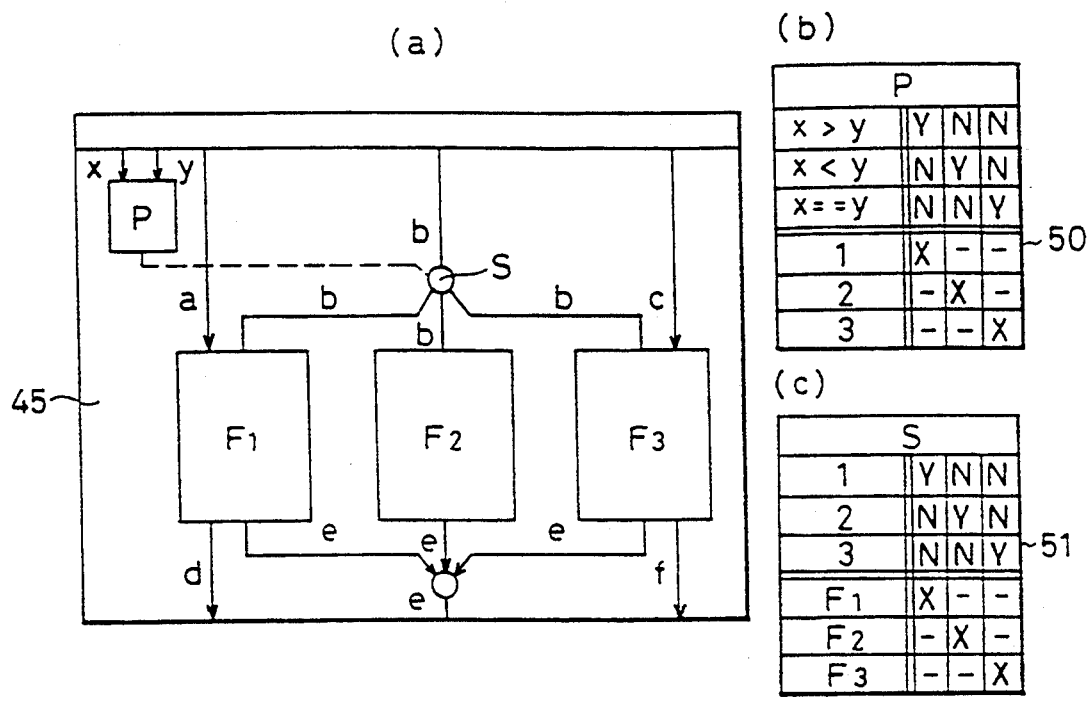
FIGS. 24A and 24B are diagrams illustrating other manners of producing construct information from combinations of a plurality of graphic representation formats.
Figure 24B:
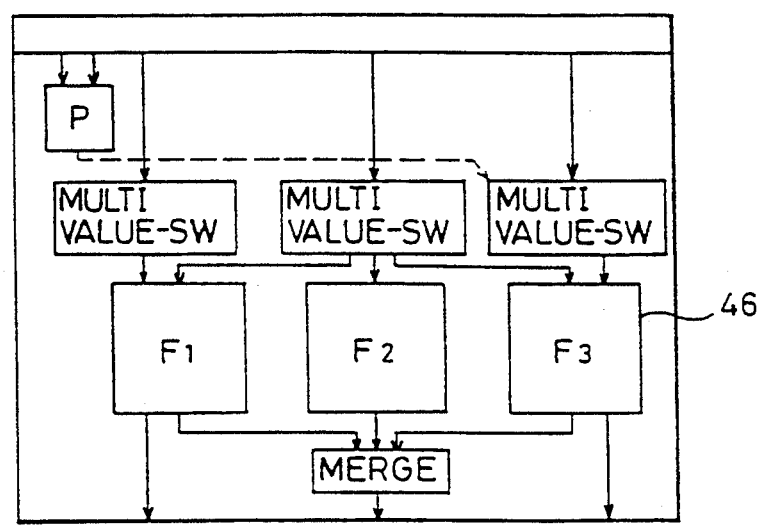

FIGS. 24A and 24B are diagrams showing one example of structure for producing construct information from a combination of graphic representation formats (specification description) performed in the mutual conversion unit CV. In the specification diagram 45 represented by a function block diagram of FIG. 24A, the operation contents of modules P and S can not be determined as to whether it is for simply forming data copy or for selection structure. However, by mapping the descriptions 50 and 51 of the determination table to respective modules P and S, the structure is determined i which module P controls branch module S so that any of modules F1-F3 can be selected according to the magnitude relation of data x, y, and branch module S transmits data b to any of modules F1–F3 according to the data from the module P. Thus, the selection structure of module P is determined and furthermore production of control information for branch control in the branch module S is allowed. Thus, production of construct information 46 including control information for the process model is then allowed (FIG. 24B).

In the above-described embodiment, a case where information for construct production is obtained by unifying a plurality of representation formats is shown. However, it is also possible to reversely produce (mutual conversion) the information in each individual representation format from the unified information as shown in FIGS. 25 and 26.

Figure 25:
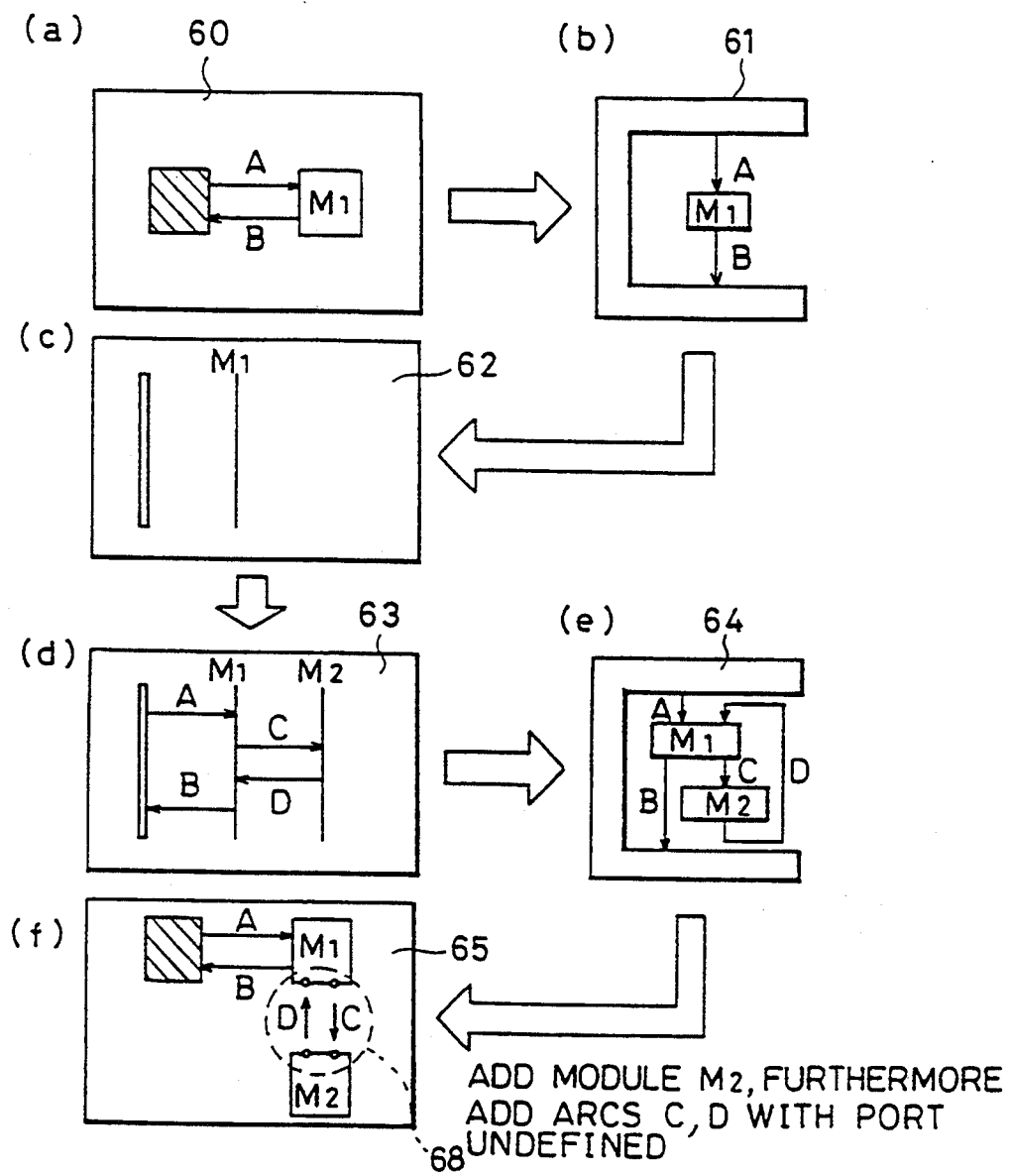
FIG. 25 is a diagram illustrating a mutual conversion manner between a function block diagram and a sequence chart executed in a mutual conversion unit.

FIG. 25 is a diagram illustrating mutual conversion between a function block diagram and a sequence chart. In FIG. 25, the internal module information 61 (FIG. 25(b)) obtained from a function block diagram 60 is converted into a sequence line information 62 (FIG. 25(c)), and a sequence line on the sequence chart is produced according to the sequence line information (FIG. 25(d)). The conversion from the internal module information to the sequence line information is performed in mutual conversion unit CV as described above, and the information is transmitted to a graphic editor having a representation format of the sequence chart. The graphic editor is then activated to produce the sequence line on the sequence chart on the display unit. In the description below, the information exchange is also made between the mutual conversion unit, and a graphic editor representating a function block diagram and a sequence chart.

An internal module M2 is further added to the sequence line information 62 obtained from the sequence chart 60 in sequence chart 63 (FIG. 25(d)). The sequence line information showing the newly produced internal module is converted into internal module information of a function block diagram and an internal module is produced on the function block diagram (FIG. 25(e)). Then, signal line information obtained by forming signal lines in the sequence chart (signal lines A-D) is converted into data dependency information. Thus, in the function block diagram 64, an arc corresponding to the produced signal line is produced. Thus, the data flow among respective modules is determined. However, the signal line information simply indicates the data flow and does not indicate to which port of the module a connection is made, so that display 68 indicating that the port connection is undefined is presented to a user in the function block diagram 64 newly produced (FIG. 25(f)). The user sees it and defines the port.

In FIG. 25, an initial state 62 of the sequence chart is produced from information 60 obtained from the function block diagram. Furthermore, addition of description, or production of an internal module and addition of data flow are made to the sequence chart 62 in the initial state, and the contents of the function block diagram is additionally produced according to the description 63 of the added sequence chart to obtain a new function block diagram 65. In this case, in the newly produced function block diagram 65, description of new information can be facilitated by presenting a user with incomplete portion 68 in the function block diagram in which a port is undefined, which enables to construct a software system more precisely.

Furthermore, by using a mutual conversion process, information of a lower level in the hierarchical description can be produced.

Figure 26A:
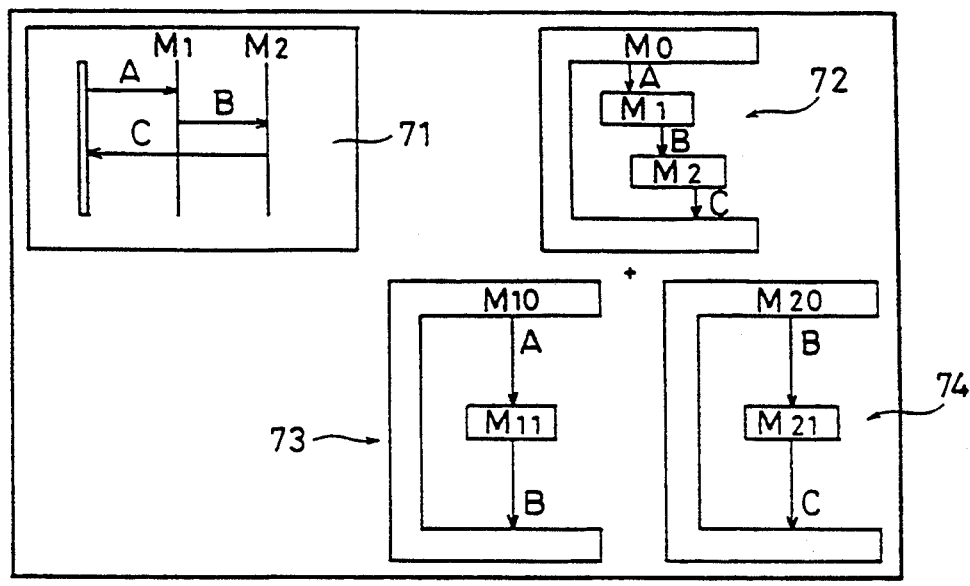
FIGS. 26A and 26B are diagrams illustrating one example of the manner for producing information of the lower level in the hierarchical description of the sequence specification information utilizing the mutual conversion function between the sequence chart and the function block diagram.
Figure 26B:
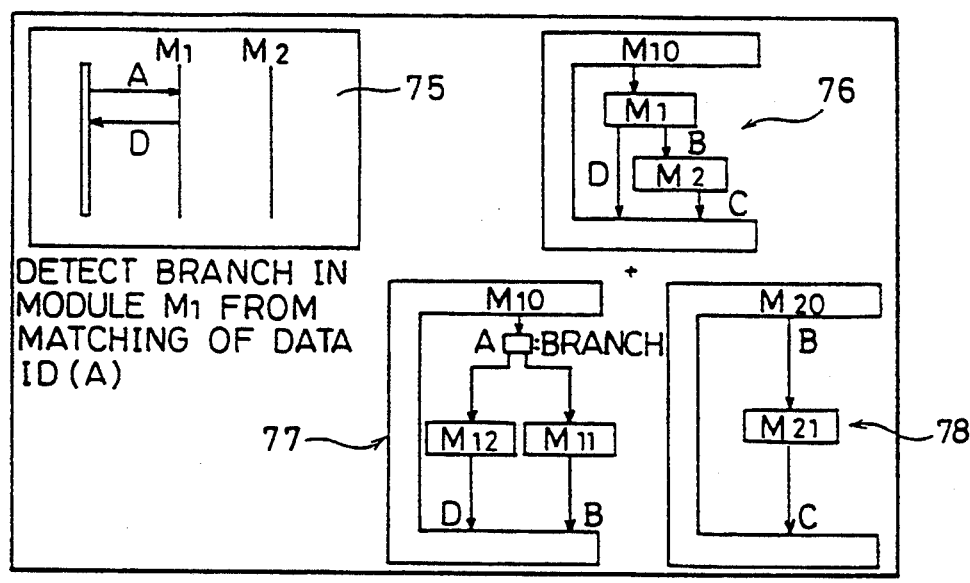

In the specification description shown in FIG. 26A, a function block diagram 72 is produced from the information represented by a sequence chart 71, and a lower level module 73 for the module M1 and a lower level module 74 for the module M2 are respectively formed in the function block diagram 72. For the mutual conversion structure, if a new sequence chart 75 is provided (FIG. 26B), that is, if a structure in which the module M1 receives data A from the external module and transmits data D is described, mutual conversion unit CV adds the information obtained in the sequence chart 75 to an already described module 72. In this case, by detecting matching of data ID's for the data A, it is recognized that the module M1 receives data A and outputs data B and D. With this structure, by considering the lower level module 73 of the hierarchical representation, it is detected that module M1 has branching structure in its lower level structure and includes lower level modules M11 and M12 respectively outputting data B and data D. In this case, module M2 reserves, for the relationship between data B and data C, that of the sequence chart 71, and its lower level structure 78 has the identical representation to that of the lower level module 74.

Figure 27A:
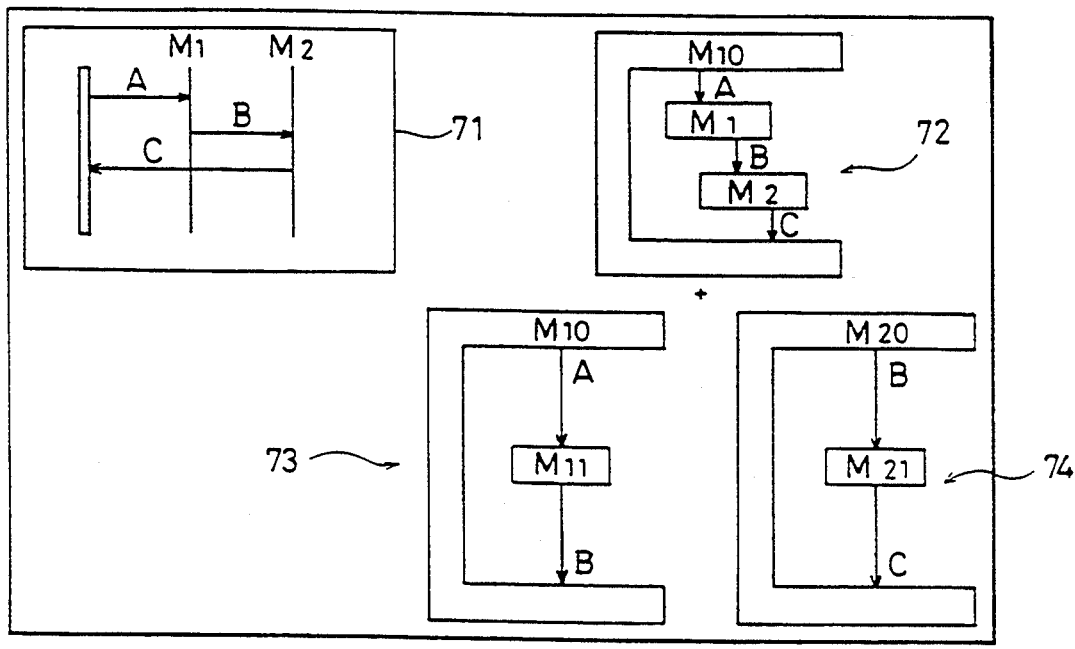
FIGS. 27A and 27B are diagrams illustrating other manners of producing information at the lower level in the hierarchical description of the specification description utilizing the mutual conversion function.
Figure 27B:
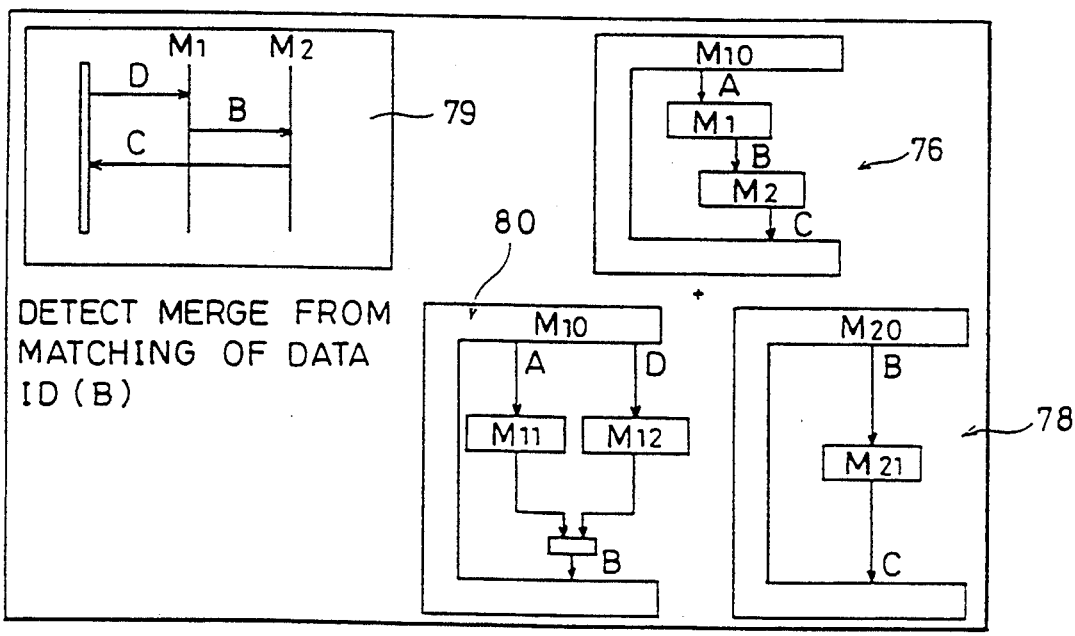

Furthermore, if a new sequence chart 79 is formed for the sequence chart 71 shown in FIG. 27A, (FIG. 27B), a function block diagram is obtained according to the information obtained by the formed sequence chart 79. In this case, as shown in FIG. 27B, by detecting matching of data IDs for the data B, if the data A and the data D have exclusive data structure with each other, such a merge structure 80 is produced for module M1 that comprises a lower level structure in which lower level module M11 receiving data A and lower level module M12 receiving data F2 are provided and outputs of modules M11 and M12 are merged to output data B.

Next, functions of the execution unit EX will be described. The execution unit EX includes a conversion unit for converting construct information produced in mutual conversion unit CV into an executable program according to the operation method of an execution model (a virtual machine) and an execution portion for executing prototyping. The execution unit is formed of such a data driven type information processing unit as shown in FIG. 1. The high function instruction processing unit 109 in FIG. 1 is, however, provided in a unified file management unit which will be described later.

The execution format information obtained by converting the construct information is generally divided into connection information representing the flow of processes represented by the data flow and representing structure of each process, constant information appearing with a link of numbers (various IDs) in the connection information, data structure information and file information. The connection information is also completed for each level in this execution Format information, the node number is uniquely produced while maintaining the relationship in which corresponding ports are linked with each other among levels.

Figure 28:
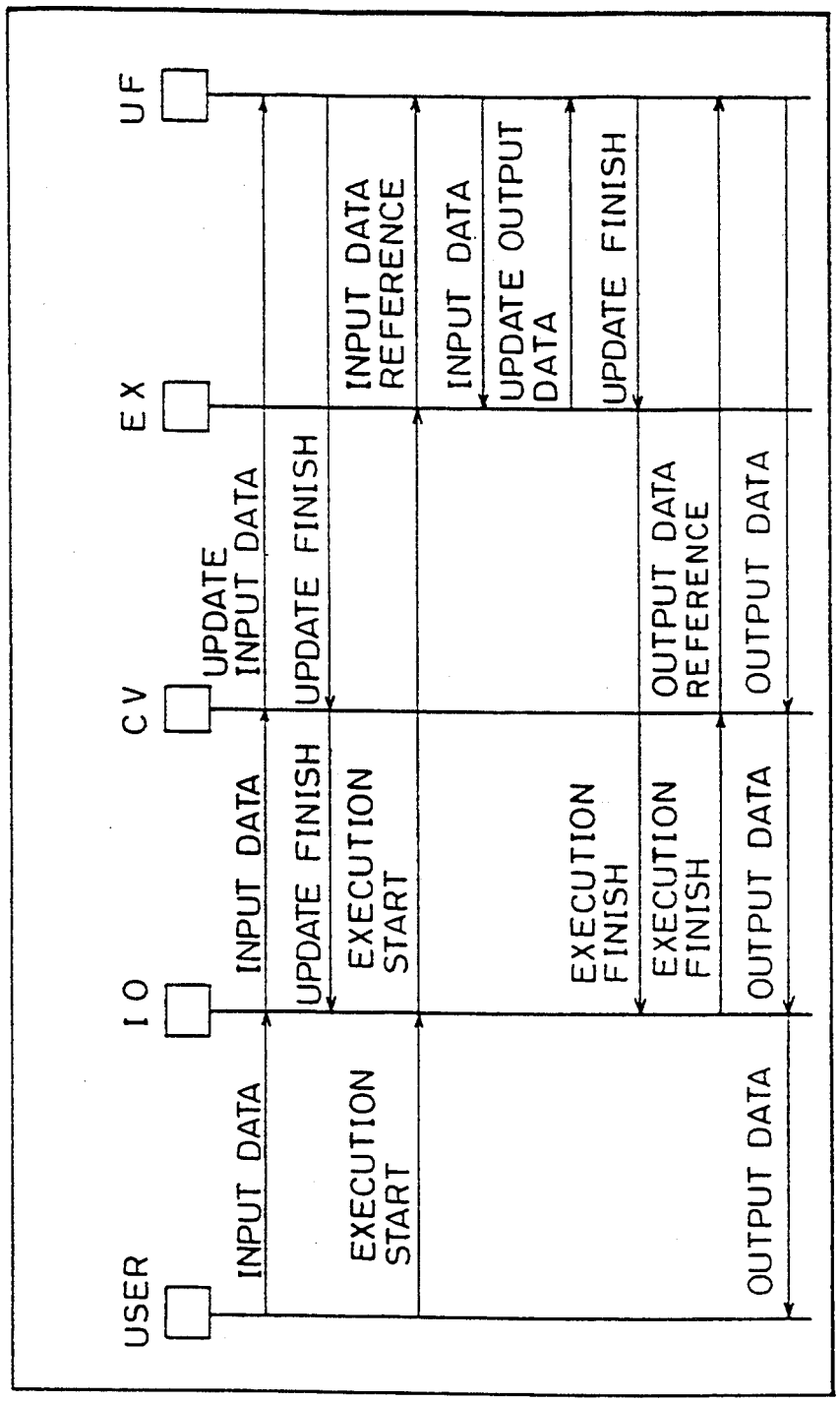
FIG. 28 is a sequence chart diagram showing prototyping operation in the program developing system shown in FIG. 6.

When the execution portion in execution unit EX executes a predetermined specification, connection of nodes are traced for sequential execution of a program. Accordingly, the conversion into information formats suitable to the execution means conversion into information format in which the connection relationship among nodes is shown by the information of the arcs added to the respective node information. Next, operation of execution unit EX will be described referring to FIG. 28 which is an operation flow diagram thereof. In FIG. 28, an operation flow of execution unit EX is shown using a sequence chart. The user specifies a data arc to which data should be inputted on the specification description. A graphic editor corresponding to the specified data arc is activated, an input window is opened to be displayed on display unit DP. A template corresponding to the data structure of the specified data arc is displayed in the input window. Setting of the input data is made so as to fill up the template. Setting of output data is made similarly to the setting of input data, in which a data arc of which data is to be monitored is specified on the specification description, an output window is opened and a template corresponding to the data structure of the specified data arc is displayed.

The input data specified by the user is written into unified file management unit UF through input/output unit IO and mutual conversion unit CV, and updating of the input data is made. When the management of data updating is terminated in the file management unit UF, information indicating the completion of the updating is transmitted to input/output unit IO through mutual conversion unit CV. The user instructs for the start of prototyping execution, and then the execution instruction is provided to execution unit EX through input/output unit IO. The execution unit EX refers to an area in which the input data set in the input window is written in the unified file management unit UF, to read out the input data and execute the program corresponding to the specified specification description.

The execution unit EX reads the input data from the unified file management unit UF, sequentially executes functions set in nodes while tracing connections of nodes included in execution format information, and obtains output data when the outputting is designated for an arc of the output data. Execution unit EX obtains the output data and then writes the output data in unified file management unit UF. Thus, the output data is updated.

Unified file management unit UF informed execution unit EX of the completion of updating the data and then input/output unit IO has the execution completion of prototyping informed of from execution unit EX. Input/output unit IO receives the execution termination instruction, and then informs the conversion unit CV of the execution termination. Mutual conversion unit CV refers to the output data written in unified file management unit UF in response to the execution termination, and reads and transmits the output data to input/output unit IO. Input/output unit IO displays the supplied output data in an output window previously opened on display unit DP.

As described above, the execution of simulation for an arbitrary level in specification description is made simply by setting an input data and an output data format. That is, introduction of an input data at an arbitrary level selected and observation of a selected, desired result data can be done integrally with the description of a specification. Thus, an environment is implemented in which the verification for matching between the contents of a described specification and the intention of a user is aided, and also confirmation of the specification, reconfirmation of overs and shorts therein and so forth can be easily performed.

A certain completed specification in a specification description is referred to as "parts". The parts management unit CP for managing the parts includes the following functions.

(1) a function of presenting parts information, (2) a function of presenting a parts name list, (3) presentation of an item data type of a table, (4) presentation of construct information, (5) a parts specification display function, (6) a function of registering parts, (7) a function of extending parts. Input/output unit IO, mutual conversion unit CV and execution unit EX can access the parts management unit CT.

Next, the parts reference operation will be described.

Figure 29:
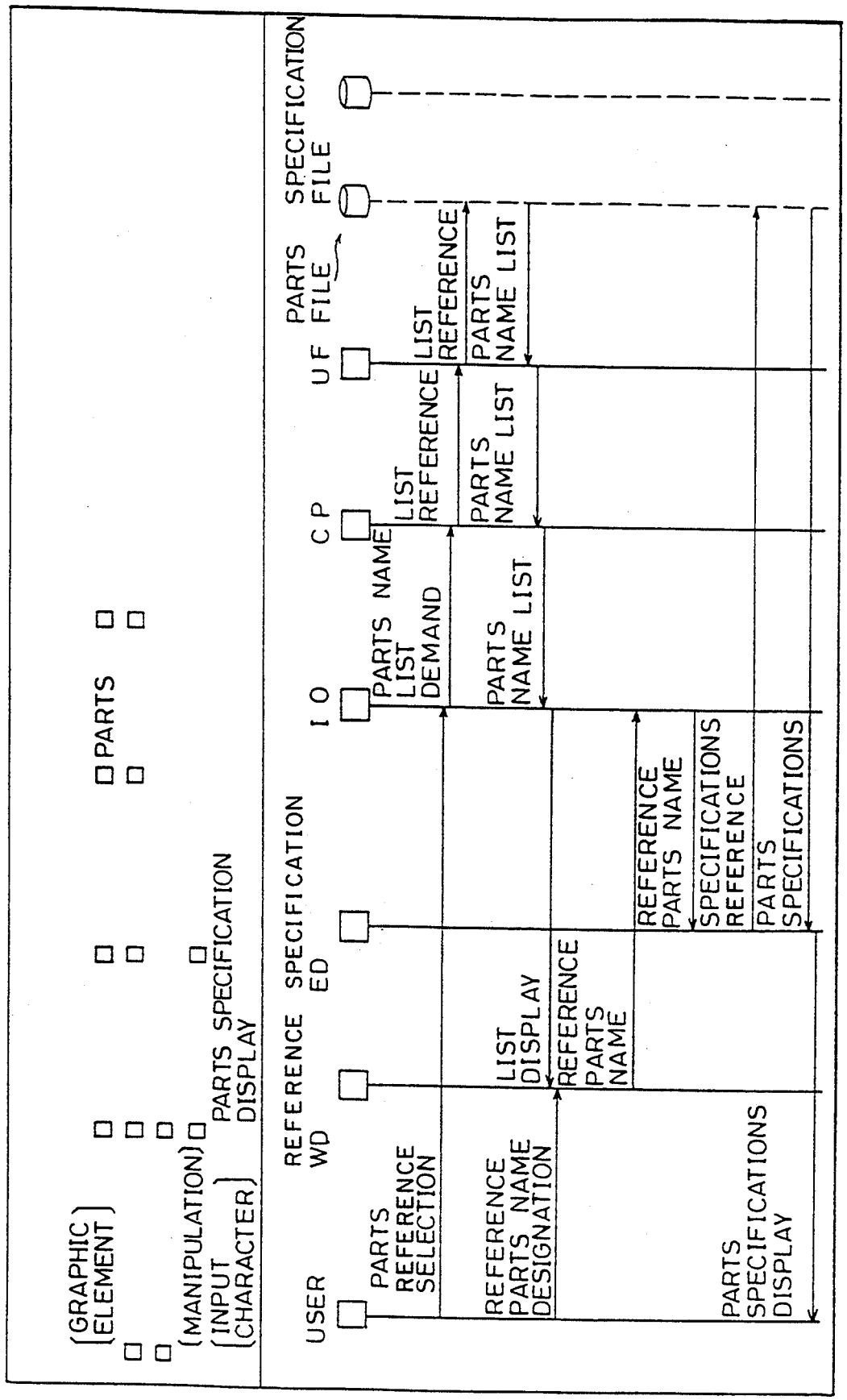
FIG. 29 is a sequence chart diagram showing parts reference operation in the program developing system shown in FIG. 6.

FIG. 29 is a diagram illustrating the flow of parts reference operation in the form of a sequence chart. When a user wants to refer to a piece of parts, the user selects "parts reference" from the menu provided by input/output unit IO. Input/output unit IO demands a parts name list of parts management unit CP in order to display a list of registered parts in response to the "parts reference" instruction. Parts management unit CP searches the parts information file through file management unit UF and transmits a list of the registered parts names to input/output unit IO through parts management unit CP. Input/output unit IO activates a graphic editor to open the parts reference window (reference WD) and displays the list of registered parts on the display unit.

The user specifies parts of which input and output information he wants to refer to out of the parts displayed in the window for parts reference (reference WD) using a data input device or a character input device such as a "mouse", for example. Input/output unit IO activates a parts specification editor (specification ED) in response to the reference parts specification from the user and hands the specified parts names to the parts specification editor.

Parts specification editor (specifications ED) refers to the parts specifications file stored in the specifications file and displays the parts specifications. Thus, the user can see on display unit DP a parts specification at the specification description level graphically represented.

Next, the citing operation of parts will be described.

When citing parts in a condition where the specification description is being made, "parts" are selected in the rendering mode of a function block diagram editor or a sequence chart editor. The editor citing parts makes request of parts requesting information for input/output unit IO. Input/output unit IO opens an window for parts citation on an instruction from an user similarly to the above-described parts reference operation to display a list of registered parts.

The user specifies parts he wants to cite from the parts displayed in the parts reference window. Input-/output unit IO requests parts information for the specified parts to parts management unit CP. Parts management unit CP retrieves parts information file through file management unit UF to supply the parts information for the specified parts to input/output unit IO.

Input/output unit IO further supplies the parts information supplied from parts management unit CP to the editor which cites the parts. The editor performs rendering on the basis of the applied parts information and also informs input/output unit IO of modification of the specification description contents.

Description will now be made on the function of unified file management unit UF. Information with respect to the contents of specification description handled by this development apparatus is represented as a single unified file. The function of manipulating this file is implemented as a data structure manipulating instruction by unified file management unit UF. Unified file management unit UF has interfaces which are declaratively coupled between other processing units (input-/output unit IO, mutual conversion unit CV, execution unit EX and parts management unit CP) for executing accesses (generation, reference, updating, deletion, etc.) to an internal data structure representing information with respect to the specification description, and integrally manages the internal data structure representing the specification description information.

Other processing units which utilize unified file management unit UF hand to unified file management unit UF operation codes for necessary data structure manipulation. The unified file management unit UF, which stores information necessary for data structure manipulation (e.g., such information as shown in FIG. 3) in advance, executes instructed data structure manipulation on the basis of the information and returns the execution results to a processing unit which called unified file management unit UF. That is, unified file management unit UF has a function of such a high function instruction processing unit 109 as shown in FIG. 2.

In this program development apparatus, a scalar (atom) and a list structure are adopted as a data structure for use. This is because if this list structure is employed, the structures of "array", "record", "vector" and the like can be represented. If this list structure is employed, the following accesses are executed: (1) access to an element by a subscript (identifier), and (2) access to an element by matches of keys. This list structure includes a logic identifier "fid" for an identifier (name) of the entire data structure to be processed, and a logic identifier "did" for identifying an array in which a data area of the size of array elements indicated by "size" in the data structure identified by the logic identifier "fid" is set as one element. An access area in a file is determined by use of those identifiers.

If unified file management unit UF is referred to by the data structure of the scalar, reference and updating by a data name is executed.

Each processing unit operates in parallel while mutually exchanging information. Thus, a multi-access request is generated to unified file managing unit UF. Since these accesses are dynamically generated, the processing unit utilizing unified file management unit UF may not determine whether or not the multi access is generated. Even if the processing unit can determine that the multi access is generated, a processing unit that has requested the access cannot be informed whether or not a processing unit that has requested an access later may execute the access to the file. Thus, unified file management unit UF comprises a mechanism for insuring consistency with respect to a series of accesses to the file in a multi process environment. As such a mechanism, a lock control mechanism is provided that sets a lock in a required range of the file in unified file management unit UF by informing unified file management unit UF whether or not a subsequent access request is made for the same record in the same file and which access request is accepted, when the processing unit utilizing unified file management unit UF makes an access request.

A lock control is implemented as one primitive. There are two types of files managed by unified file management unit UF, i.e., a temporary file and a permanent file. The temporary file is consumed if used once. The permanent file is reserved throughout execution of an object program and before and after such execution. When a primitive using the file is executed, a temporary file to be written is always produced. Description will now be made on a specific example of production of a software system by the program development apparatus being one embodiment of the present invention.

As to stock management problems, the case where a module for retrieval by "keys" is described will now be considered. The following problem will now be described as a specific problem.

Retrieve data is a list of articles. This article list has such a structure as "article list: article code, article name, article quantity, article delivering source". A retrieval item (key) is the article code or quantity. In the case of a retrieval in which the quantity is "key", articles corresponding to the article code with a given quantity or larger quantity are listed.

Figure 30:
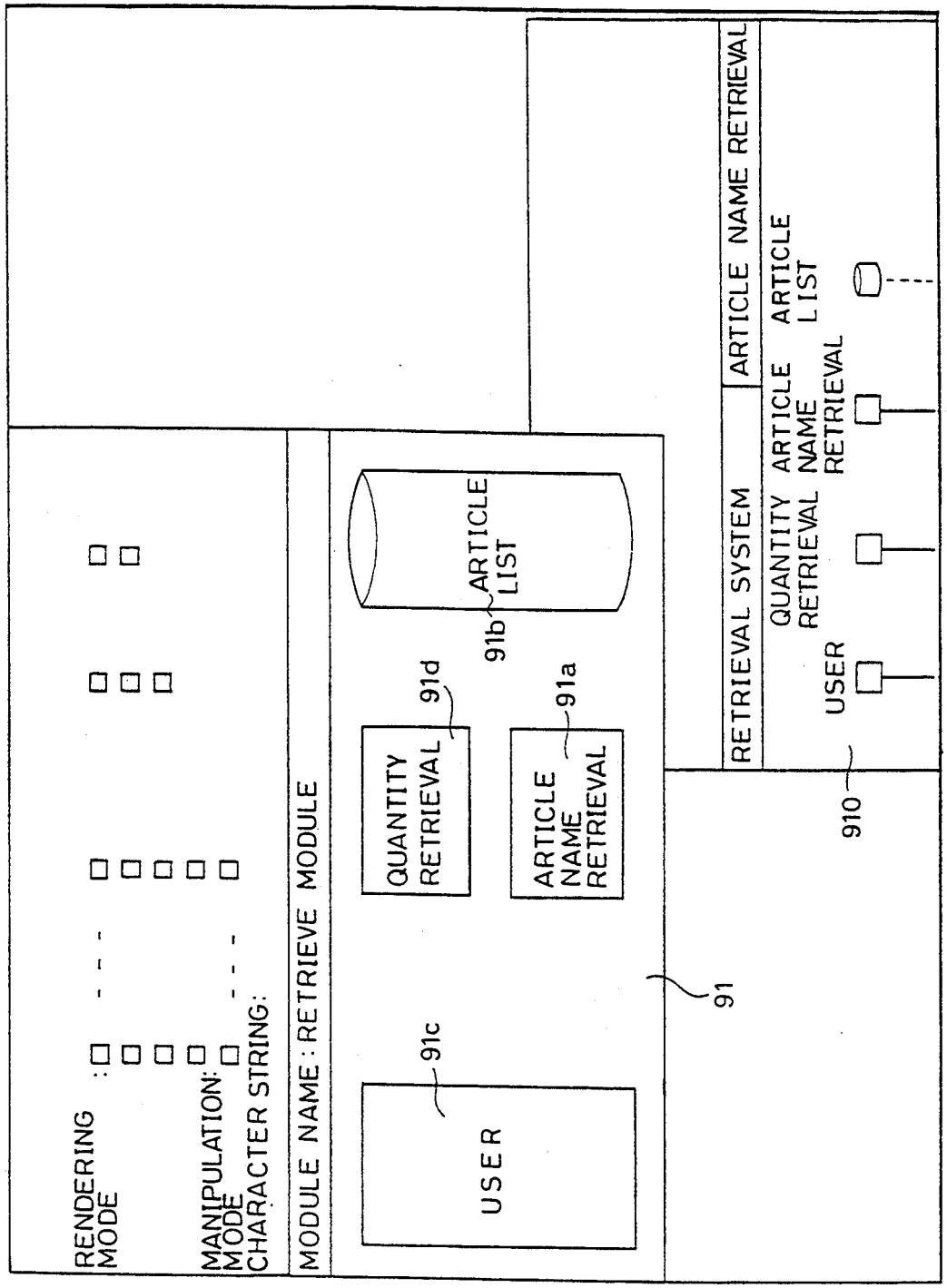
FIGS. 30-34 are diagrams illustrating specific examples of the specification description using the program developing system shown in FIG. 6.

An interface of a system with external environments is first described as shown in FIG. 30. This object system to be described includes an article name retrieval module 91a in which an article name code is input and a corresponding list is output, an article list file 91b, an external module (user) 91c, and an article quantity retrieval module 91d in which a quantity of an article is input and a corresponding list is output. This description from the functional aspect is represented by a functional block diagram 91. At this time, module information represented in this functional block diagram 91 is converted into a sequence chart and displayed (see the lower right portion of FIG. 30).

Figure 31:
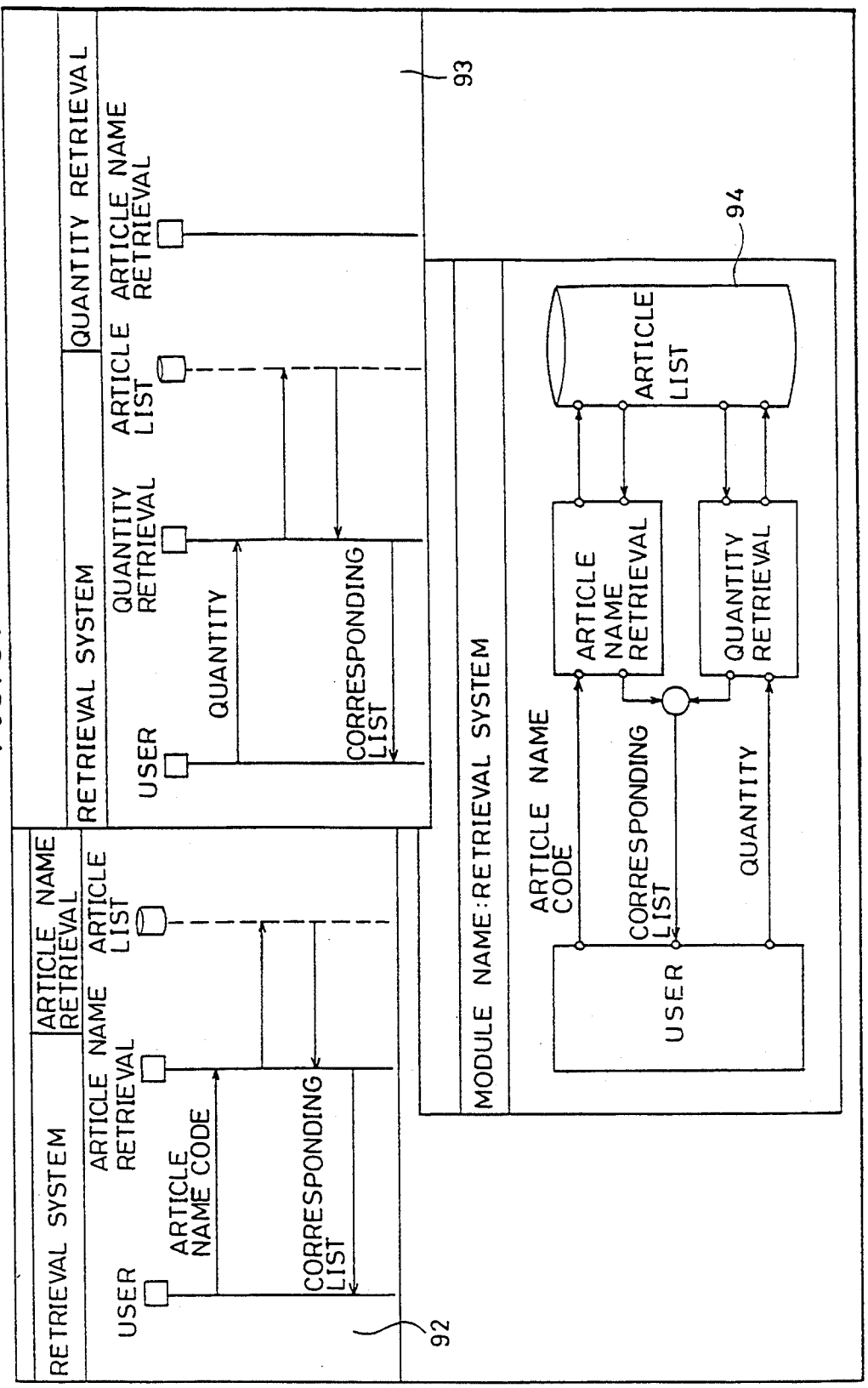

Next, a sequence relation of the data flow between the modules is described as shown in FIG. 31. An article name retrieval sequence is described in a first sequence chart 92, while a quantity retrieval sequence is described in a second sequence chart 93. Signal lines described in sequence charts 92 and 93 are immediately converted into data arc on a functional block diagram 94 and displayed thereon. At that time, since port information is not reflected in the sequence charts, the port information is described in functional block diagram 94.

While the mutual relation of data is described by using the sequence charts, it may be described by using functional block diagrams. As described above, if common information are mutually converted and reflected between different representation formats, inconsistencies between descriptions can be avoided.

Figure 32:
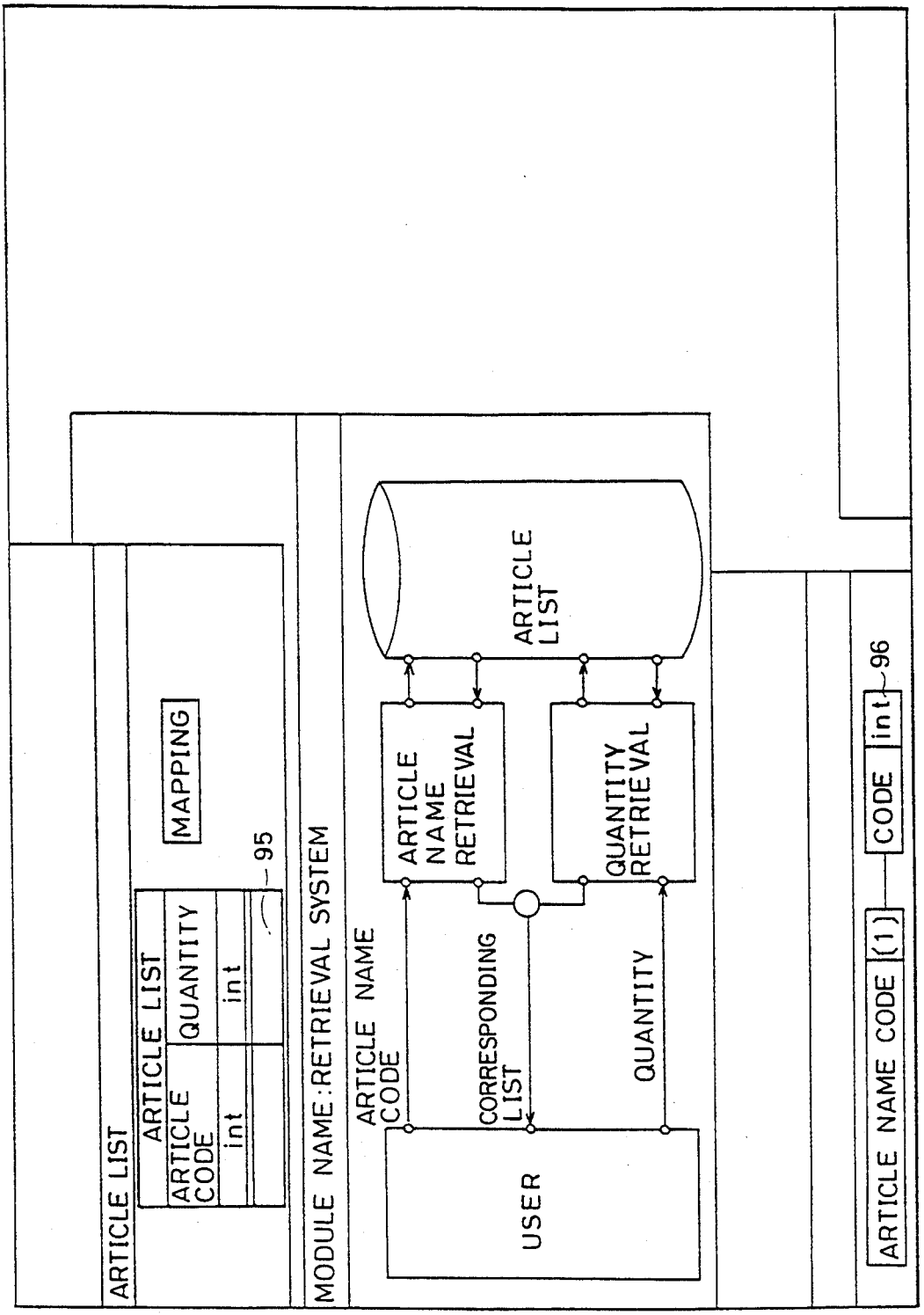

Next, a data structure is described as shown in FIG. 32. A corresponding list (not shown) and an article list are described in a relation table 95, while an article name code and an article quantity are described in a data block diagram 96. In the example shown in FIG. 32, the corresponding list describes only the article name code and the article quantity which are inevitably necessary. The described data structure and data arc on the functional block diagram and the signal lines on the sequence chart are mapped by a mapping manipulation. These mapping manipulation makes the user free from an annoying and complicated work of naming the articles.

Figure 33:
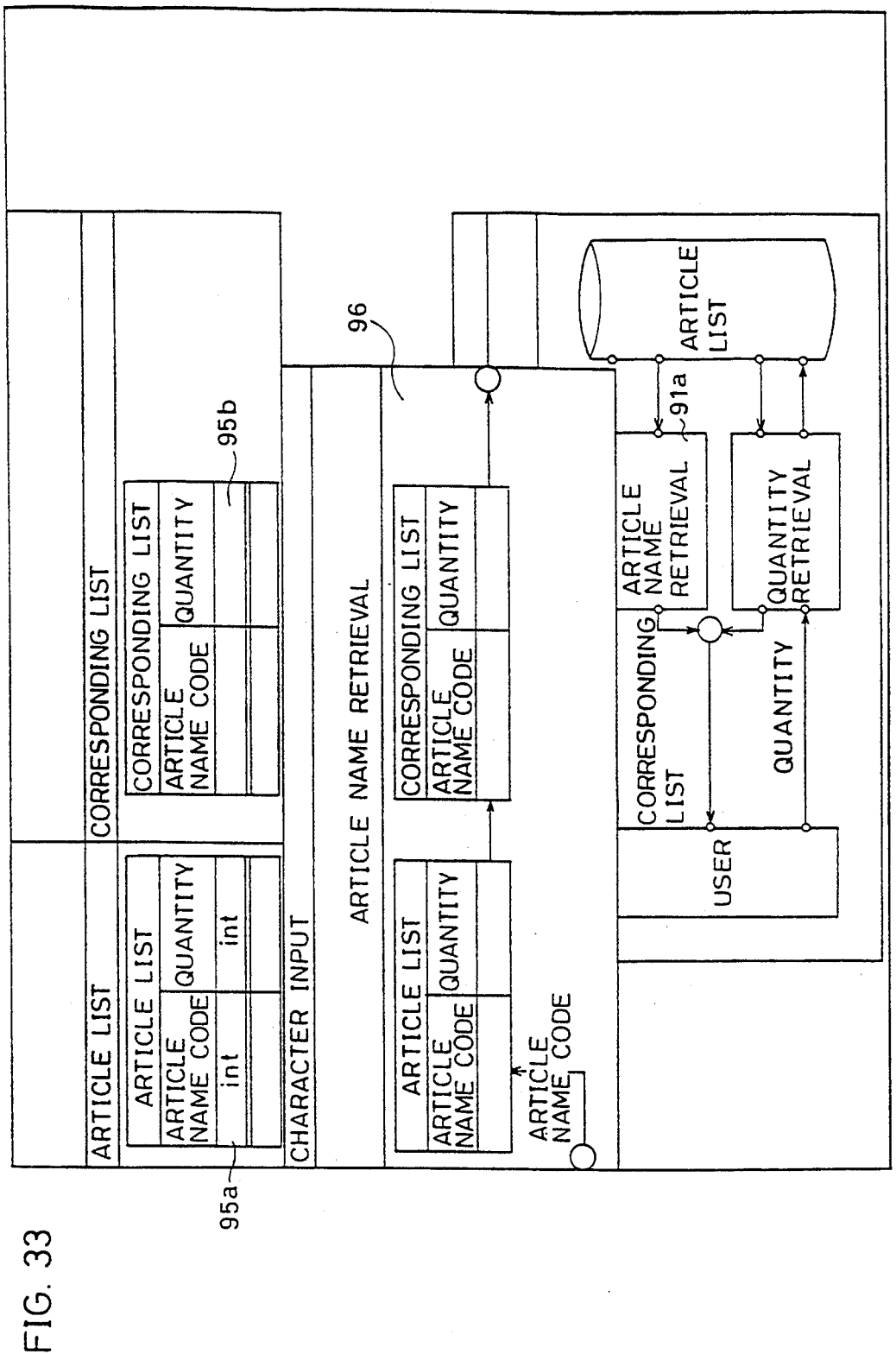

Then, a definition of the detail of an internal module is executed as shown in FIG. 33. Referring to FIG. 33, an article name retrieval module 91a included in an object module to be described is a file manipulation and is hence described in a table handling diagram 96. In this table handling diagram 96, input and output information is converted and reflected by the functional block diagram that has already been described before. The structure of table data in table handling diagram 96 is cited from relation tables 95a and 95b. The cited data structure is mapped with an original relation table. Accordingly, if a data structure of the original relation table is altered, then a data structure in this table handling diagram 96 is also altered. This makes it possible to prevent a forgetting of alteration with the alteration of specifications.

Figure 34:
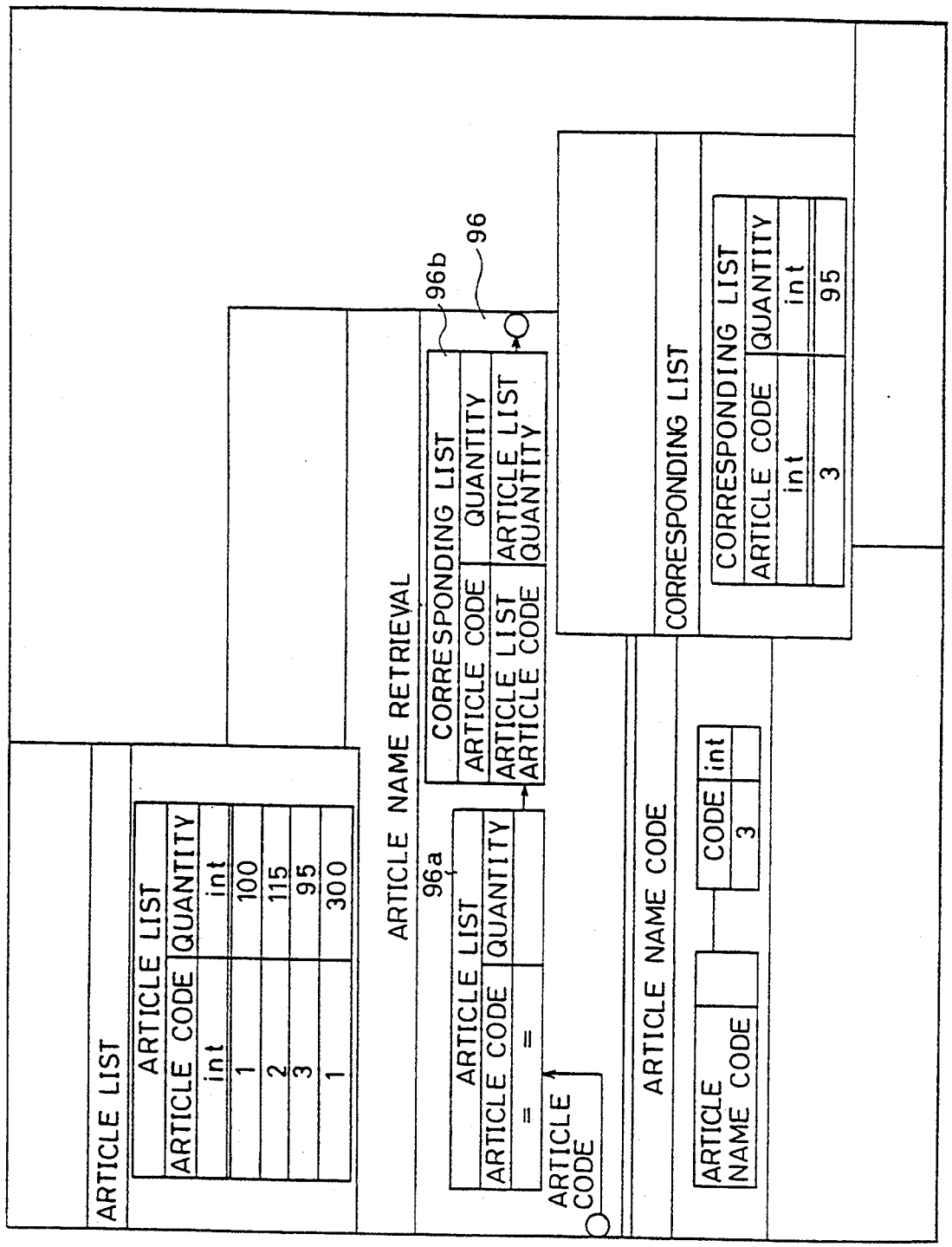

In the article name retrieval module, its specification description is completed and then becomes executable by the description in the table handling diagram shown in FIG. 33. A prototyping is carried out for this executable article name retrieval module as shown in FIG. 34, to verify the specification description contents. More specifically, an article code of an article list 96a is set as input data, while a corresponding list 96b is set as output data. An article name code included in the article list is filled in an article code of article list 96a. A subsequent executing operation of the apparatus causes an article corresponding to this article name code 3 to be displayed on a corresponding list along with a corresponding quantity thereof. The specification description contents is altered on the basis of the result of the execution obtained by this prototyping and in accordance with an object specification, then executed again and verified.

If the description of the specification of the retrieval system is thereafter completed, the description is a single module that is partly completed and is registered as "parts".

According to the program developing system described above, a single piece of specification definition information (one function) can be described using a plurality of representation formats, which enables to define a software system involving various aspects, resulting in configuring a software system with high quality.

As described above, according to the present invention, when a data packet including a high function instruction is inputted into operation process means, high function instruction processing means performs an operation process of the data packet on the basis of previously stored processing information necessary for executing high function instructions, so that even when executing instructions of high function instructions requiring a large amount of processing information, e.g., instructions of relation operation, sorting operation, calculation operation of structure data, structure of a packet of data inputted into operation processing means is similar to structure of a data packet including a simple instruction, resulting in no requirements of putting a large amount of processing information to a data packet and transporting the information from program storing means to operation processing means. As a result, the system can be effectively utilized, and also, when describing a program, complicated operation processes can be handled at the level same as normal simple instructions without partitioning the complicated operation processes into simple instructions, which considerably reduces the labor required for program generation as compared to a conventional data driven type information processing apparatus.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A data driven type information processing apparatus, comprising:

input means for inputting a data packet at least including a node number and data;

program storing means, coupled to said input means, for storing a data flow program, reading at least a node number and instruction information from the data flow program on the basis of the node number included in the data packet provided from said input means, and producing and outputting a new data packet including the node number, the instruction information, and the data in said data packet;

pair detecting means for receiving the data packet outputted from said program storing means, detecting two data packets to be a pair having the same node number, and producing and outputting a new data packet having the data in both of the data packets;

operation processing means for receiving the data packet outputted from said pair detecting means, performing an operation process related to the data included int he data packet on the basis of the instruction information included in the data packet, and producing and outputting a data packet having data indicating the operation result; and output control means for receiving the data packet outputted from said operation processing means and controlling whether the data packet is to be externally outputted or to be outputted to said input means; wherein said operation processing means comprises, branching means for branching the data packet received from sad program storing means into a data packet having a simple instruction and a data packet having a high function instruction, simple instruction processing means for performing an operation process of the data packet having said simple instruction of the data packets branched by said branching means, and outputting a processed data packet, high function instruction processing means which stored in advance process information necessary for processing a high function instruction for performing operation process of the data packet having said high function instruction on the basis of the process information of the data packets branched by said branching means, for outputting a processed data packet, and junction means for joining the processed data packet from the simple instruction processing means and the processed data packet from the high function instruction processing means to output the processed data packets to said output control means.

2. The data type information processing apparatus according to claim 1, further comprising controlled means to be controlled by said high function instruction processing means.

3. The data driven type information processing apparatus according to claim 2, wherein said high function instruction is a processing instruction of structural data, and said controlled means comprises structural data storing means for storing structural data to be processed by said high function instruction processing means.

4. The data driven type information processing apparatus according to claim 3, wherein the data included in the data packet having said high function instruction includes address data indicating a portion in which structural data objective to the execution of the high function instruction is to be stored.

5. The data driven type information processing apparatus according to claim 4, wherein said high function instruction processing means comprises;

a specification data memory storing processing information necessary for high function instruction processing for each node number, node number extracting means for extracting the node number from the data packet provided from said pair data detecting means and reading the processing information of the corresponding node number from said specification data memory, instruction information extracting means for extracting instruction information from the data packet provided from said pair data detecting means, data extracting means for extracting data from the data packet provided from said pair data detecting means, processing means for applying a process based on the processing information read from said specification memory to structural data in said structural data storing means specified with address data included in the data extracted by said data extracting means and outputting address data of the structural data after the process, and packet synthesizing means for putting on a single packet and outputs the node number extracted by said node number extracting means, the instruction information extracted by said instruction information extracting means and the address data outputted from said processing means.

* * * * *

* * * * *